United States Patent
Mizoguchi

(10) Patent No.: US 12,346,106 B2
(45) Date of Patent: Jul. 1, 2025

(54) VEHICLE TRAVELING REMOTE CONTROL SYSTEM

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 296 days.

(21) Appl. No.: 18/059,078

(22) Filed: Nov. 28, 2022

(65) Prior Publication Data

US 2023/0176571 A1    Jun. 8, 2023

(30) Foreign Application Priority Data

Dec. 7, 2021  (JP) .................................. 2021-198253

(51) Int. Cl.
   *G05D 1/00*  (2024.01)
   *B60W 30/06*  (2006.01)
   (Continued)

(52) U.S. Cl.
   CPC ........... *G05D 1/0027* (2013.01); *B60W 30/06* (2013.01); *B60W 30/18159* (2020.02);
   (Continued)

(58) Field of Classification Search
   CPC ........ G05D 1/00; G05D 1/0038; G05D 1/221; G05D 1/0022; B60W 30/06;
   (Continued)

(56) References Cited

U.S. PATENT DOCUMENTS 7,298,691 B1 * 11/2007 Yonge, III ........ H04L 12/40136
                                                           375/220
10,268,191 B1 *  4/2019 Lockwood ........... G05D 1/0027
(Continued)

FOREIGN PATENT DOCUMENTS

JP     2019-133498 A    8/2019
WO     2018/179392 A1   10/2018

*Primary Examiner* — Aniss Chad
*Assistant Examiner* — Elizabeth J Slowik
(74) *Attorney, Agent, or Firm* — Rimon P.C.

(57) ABSTRACT

In a vehicle traveling remote control system, a remote control apparatus communicates with vehicles and periodically transmits a remote control value used to control traveling of each vehicle. The vehicle traveling remote control system includes a transmission control unit and a remote traveling control unit provided in each vehicle. The transmission control unit transmits to the remote control apparatus information including vehicle outside captured images generated by cameras mounted on the vehicle. The remote traveling control unit periodically executes traveling control of the vehicle based on remote control, with the remote control value. Upon determining that a communication situation between the vehicle and the remote control apparatus or a processing situation of the remote control apparatus influences the traveling control, the transmission control unit selects any of the vehicle outside captured images based on a traveling situation of the vehicle, and transmits the selected image to the remote control apparatus.

10 Claims, 14 Drawing Sheets

(51) Int. Cl.
  *B60W 30/18* (2012.01)
  *G05D 1/221* (2024.01)
  *G06V 20/56* (2022.01)

(52) U.S. Cl.
  CPC ........... *G05D 1/0038* (2013.01); *G05D 1/221* (2024.01); *G06V 20/56* (2022.01)

(58) Field of Classification Search
  CPC . B60W 30/18159; G06V 20/56; G06V 20/54; G08G 1/096725; G08G 1/096775; H04W 4/44; H04W 4/46
  See application file for complete search history.

(56) References Cited

U.S. PATENT DOCUMENTS

| | | | |
|---|---|---|---|
| 11,884,265 B1* | 1/2024 | Suzuki | G08G 1/143 |
| 2019/0243355 A1* | 8/2019 | Izu | H04N 23/698 |
| 2020/0174465 A1* | 6/2020 | Minagawa | E02F 9/267 |
| 2020/0326702 A1* | 10/2020 | Iwamoto | B60T 7/16 |
| 2020/0355506 A1 | 11/2020 | Muto | |
| 2021/0027051 A1* | 1/2021 | Zass | G06Q 50/26 |
| 2021/0027625 A1* | 1/2021 | Jung | G08G 1/09626 |
| 2022/0004187 A1* | 1/2022 | Matsunaga | B60K 35/22 |
| 2022/0301192 A1* | 9/2022 | Boardman | G06T 7/579 |
| 2022/0371589 A1* | 11/2022 | Kono | G05D 1/0027 |
| 2024/0069576 A1* | 2/2024 | Yang | B64D 45/00 |

\* cited by examiner

[CASE 1]

[CASE 2]

[CASE 3]

[CASE 4 : Step1]

[CASE 4 : Step2]

[CASE 4 : Step3]

[CASE 5 : Step1]

[CASE 5 : Step2]

[CASE 5 : Step3]

VEHICLE TRAVELING REMOTE CONTROL SYSTEM

CROSS-REFERENCE TO RELATED APPLICATIONS

The present application claims priority from Japanese Patent Application No. 2021-198253 filed on Dec. 7, 2021, the entire contents of which are hereby incorporated by reference.

BACKGROUND

The disclosure relates to a vehicle traveling remote control system.

In recent years, a technique for automation of traveling of a vehicle, such as an automobile, has been developed.

In such a technique, position information and a vehicle outside captured image, for example, acquired by a vehicle may be transmitted to a remote control server, and the remote control server may generate a remote control value available for traveling control of the vehicle. For example, reference is made to Japanese Unexamined Patent Application Publication No. 2019-133498 and International Publication No. WO 2018/179392.

SUMMARY

An aspect of the disclosure provides a vehicle traveling remote control system in which a remote control apparatus is configured to communicate with vehicles, and configured to periodically transmit, to each of the vehicles, a remote control value to be used to control traveling of the each of the vehicles. The vehicle traveling remote control system includes a remote control apparatus, a transmission control unit, and a remote traveling control unit. The transmission control unit is provided in the each of the vehicles, and configured to transmit, from the each of the vehicles to the remote control apparatus, information including vehicle outside captured images generated by vehicle outside cameras mounted on the each of the vehicles. The remote traveling control unit is provided in the each of the vehicles, and configured to periodically execute traveling control of the each of the vehicles based on remote control, by using the remote control value periodically received by the each of the vehicles from the remote control apparatus. The transmission control unit of the each of the vehicles is configured to determine, during the remote control, whether or not a communication situation between the each of the vehicles and the remote control apparatus or a processing situation of the remote control apparatus influences the traveling control executed by the remote traveling control unit using the remote control value periodically, and select at least one vehicle outside captured image of the vehicle outside captured images based on a traveling situation of the each of the vehicles, and transmit the selected vehicle outside captured image to the remote control apparatus, in a case where the transmission control unit determines that the communication situation or the processing situation influences the traveling control executed by the remote traveling control unit.

An aspect of the disclosure provides a vehicle traveling remote control system in which a remote control apparatus is configured to communicate with vehicles, and configured to periodically transmit, to each of the vehicles, a remote control value to be used to control traveling of the each of the vehicles. The vehicle traveling remote control system includes circuitry. The circuitry is provided in the each of the vehicles. The circuitry is configured to transmit, from the each of the vehicles to the remote control apparatus, information including vehicle outside captured images generated by vehicle outside cameras mounted on the each of the vehicles. The circuitry is configured to periodically execute traveling control of the each of the vehicles based on remote control, by using the remote control value periodically received by the each of the vehicles from the remote control apparatus. The circuitry is configured to determine, during the remote control, whether or not a communication situation between the each of the vehicles and the remote control apparatus or a processing situation of the remote control apparatus influences the traveling control periodically executed using the remote control value. The circuitry is configured to select at least one vehicle outside captured image of the vehicle outside captured images based on a traveling situation of the each of the vehicles, and transmit the selected vehicle outside captured image to the remote control apparatus, in a case where the circuitry determines that the communication situation or the processing situation influences the traveling control.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
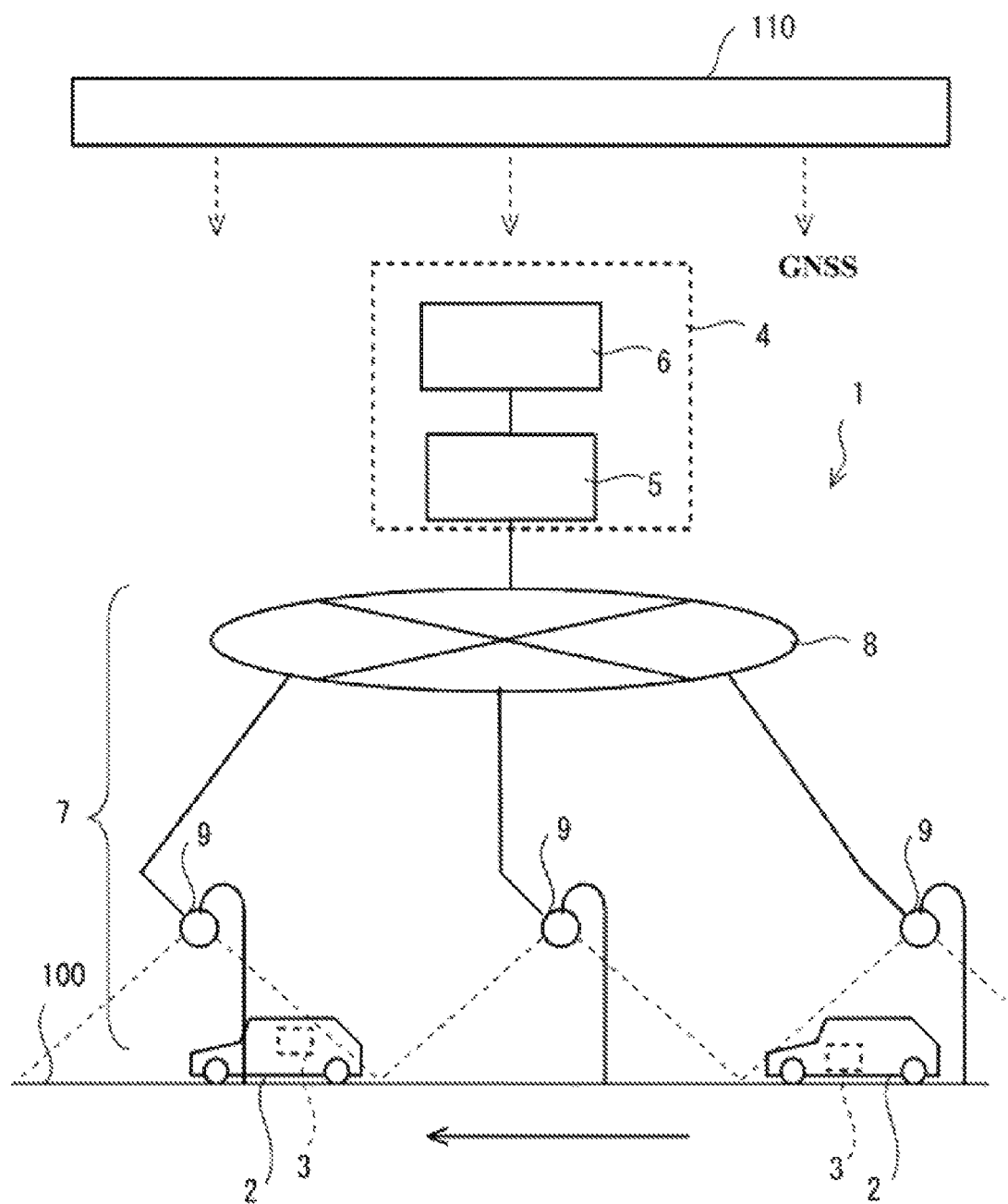
FIG. 1 is a configuration diagram illustrating a remote control system for traveling of a vehicle, according to one example embodiment of the disclosure.

A remote control server has to keep generating and transmitting a remote control value for each of multiple vehicles and periodically for each vehicle. This places heavy processing load on the remote control server.

If each vehicle whose traveling is controlled by remote control becomes unable to periodically keep receiving the remote control value at an appropriate time interval, it can become difficult for each vehicle to appropriately keep executing traveling control using the remote control value.

In addition, it is desired that own vehicle information transmitted by the vehicle to the server for the remote control include vehicle outside captured images obtained by multiple vehicle outside cameras of the vehicle, to enable the remote control server to appropriately determine a traveling situation of the own vehicle to obtain a favorable remote control value. If the remote control server is unable to obtain the vehicle outside captured images of surroundings of the vehicle from each vehicle, it can be difficult for the server to appropriately determine the traveling situation of each vehicle, and to generate a remote control value favorably corresponding to the traveling situation of each vehicle.

It is desirable to provide a vehicle traveling remote control system that makes it possible to improve remote control of traveling of a vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

FIG. 1 is a configuration diagram illustrating a remote control system 1 for traveling of a vehicle 2, according to a first example embodiment of the disclosure.

The remote control system 1 illustrated in FIG. 1 may be configured to make it possible to remotely control the traveling of the vehicle 2. The remote control system 1 may include control systems 3 and a remote control apparatus 4. The respective control systems 3 may be provided in multiple vehicles 2. The remote control apparatus 4 may include a server 5 and a remote control value generator 6 configured to generate a remote control value. The vehicles 2 and the server 5 of the remote control apparatus 4 may be coupled to be able to wirelessly communicate with each other by a communication system 7. The communication system 7 may include multiple base stations 9 and a communication network 8. The base stations 9 may be arranged along, for example, a road 100 on which the vehicle 2 travels. The vehicles 2, and the remote control apparatus 4 separate from the vehicles 2 communicate with each other. This makes it possible to repeatedly transmit, from the remote control apparatus 4 to each of the vehicles 2, the remote control value to be used to control the traveling of the vehicle 2.

FIG. 1 illustrates global navigation satellite system (GNSS) satellites 110 that output GNSS radio waves receivable by the vehicles 2 and the server 5. The vehicle 2 or the server 5 is able to obtain its position and time based on a common positioning system by receiving the radio waves from the GNSS satellites 110.

The vehicle 2 may be, for example, an automobile. The vehicle 2 may also be referred to as an own vehicle. Other non-limiting examples of the vehicle 2 may include a motorcycle, a cart, and a personal mobility. Under traveling control of the control system 3 provided in the own vehicle, the vehicle 2 may be caused to travel on, for example, the road 100 by driving force of an engine or a motor serving as a power source, caused to decelerate and stop by actuation of a braking device, and caused to change its traveling direction leftward or rightward by actuation of a steering device. Basically, the control system 3 of the vehicle 2 may be configured to perform the traveling control based on manual driving on the basis of an operation performed by an occupant of the own vehicle. The control system 3 may also be configured to perform control of assisting traveling based on manual driving on the basis of a detection result obtained by the own vehicle. The control system 3 may also be configured to perform the traveling control based on automatic driving by using, for example, high-precision map data together with the detection result obtained by the own vehicle.

The base stations 9 may include, for example, the base station 9 of a carrier communication network for mobile terminals, etc., and a base station for ITS service or ADAS service for the vehicle 2. The base station 9 of the carrier communication network may be, for example, a fifth-generation base station. The base station 9 may be fixedly installed on, for example, a road shoulder, a road surface, or a building, or may be mounted on a mobile body, such as the vehicle 2, a vessel, a drone, or an aircraft.

The base station 9 may establish a wireless communication path for transmission and reception of information with an access point (AP) communicator of the control system 3 of the vehicle 2 present within the reach of radio waves. In a case where the vehicle 2 travels on the road 100 to move out of the reach of radio waves, the base station 9 that establishes the wireless communication path may switch between the base stations 9. Thus, the base stations 9 arranged along the road 100, for example, enable the vehicle 2 to keep establishing the wireless communication path constantly while traveling.

A wireless communication path that is established with the fifth-generation base station makes it possible to transmit and receive a significantly large amount of information at high speed, as compared with a wireless communication path that is established with a fourth-generation base station. The fifth-generation base station may have advanced information processing ability; for example, the base stations 9 may be configured to transmit and receive information to and from each other. Although the vehicles 2 may directly transmit and receive information to and from each other in vehicle-to-vehicle (V2V) communication of the vehicles 2, the vehicles 2 may transmit and receive information to and from each other via the fifth-generation base station.

It is expected that using the fifth-generation base station enables the remote control apparatus 4 and each vehicle 2 to communicate with each other at high speed with a delay time on the order of milliseconds at maximum in one direction, i.e., an upstream direction or a downstream direction. However, in a case where the multiple vehicles 2 communicate with the remote control apparatus 4, it is difficult to achieve communication at the maximum communication speed equally for the multiple vehicles 2.

In a case where the vehicle 2 is traveling, the base station 9 with which the vehicle 2 establishes the communication path may switch in response to a change in the position of the vehicle 2. A handover process for switching of the base station 9 can take time.

The communication network 8 may include, for example, a communication network for the carrier communication network, a communication network for the ITS service or the ADAS service, and the Internet, which is an open wide-area communication network. The communication network 8 may include a dedicated communication network newly provided for the remote control system 1. The communication network for the carrier communication network and the Internet may achieve best-effort communication. On a best-effort communication network, a communication band available to each device and a transmission delay of communication may dynamically change depending on a communication environment, instead of being fixed. For example, on a communication network for communication based on a TCP/IP protocol, collision due to asynchronous communication can occur, which can cause a transmission delay due to frame retransmission. A transmission delay due to frame retransmission is likely to occur in a case where the handover process takes time.

Figure 2:
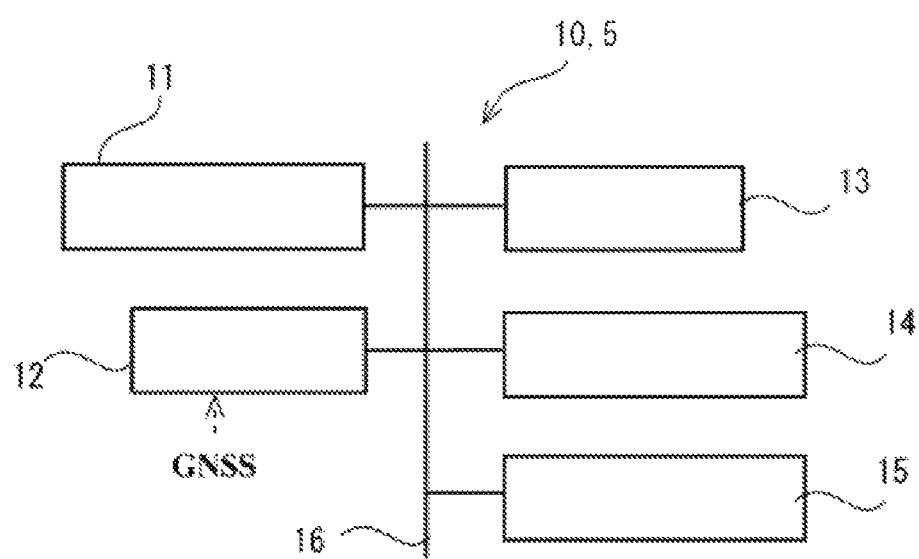
FIG. 2 is a hardware configuration diagram illustrating a computer that may be used for a server of a remote control apparatus illustrated in FIG. 1.

FIG. 2 is a hardware configuration diagram illustrating a computer 10 that may be used for the server 5 of the remote control apparatus 4 illustrated in FIG. 1.

The computer 10 illustrated in FIG. 2 may include a server communication device 11, a server GNSS receiver 12, a server timer 13, a server memory 14, a server CPU 15, and a server bus 16. The server communication device 11, the server GNSS receiver 12, the server timer 13, the server memory 14, and the server CPU 15 may be coupled to the server bus 16.

The server communication device 11 may be coupled to the communication network 8. The server communication device 11 may transmit and receive information to and from another device coupled to the communication network 8, for example, the base station 9 or the control system 3 of the vehicle 2.

The server GNSS receiver 12 may receive the radio waves from the GNSS satellites 110 to obtain a current time.

The server timer 13 may measure a time and a time period. The time of the server timer 13 may be calibrated by the current time of the server GNSS receiver 12.

The server memory 14 may hold a program to be executed by the server CPU 15, and data.

The server CPU 15 may read the program from the server memory 14 and execute the program. This enables a server control unit to be implemented in the server 5.

The server CPU 15 serving as the server control unit may manage overall operation of the server 5 and overall control of the remote control system 1. The server CPU 15 may manage, for example, traveling of the vehicles 2 that use the remote control system 1.

For example, the server CPU 15 may manage information received from each of the vehicles 2, control generation of the remote control value for the vehicle 2 from which the information has been received, and control transmission of the remote control value generated for the vehicle 2 from which the information has been received. In this case, the server memory 14 may hold the information received from the vehicles 2 and the high-precision map data, for example, to be used to generate the remote control value. The server CPU 15 may repeat the generation and transmission of the remote control value for each vehicle 2, by repeatedly receiving the latest information from each vehicle 2. This enables each vehicle 2 to continue the traveling based on the remote control value repeatedly generated by the remote control apparatus 4.

The remote control value generator 6 may be basically configured to operate similarly to a traveling control ECU 24 of the control system 3 of the vehicle 2 to be described later. The computer 10 illustrated in FIG. 2 may be used as hardware for the remote control value generator 6.

The example embodiment describes that the remote control value generator 6 configured to generate the remote control value for each vehicle 2 is separate from the server 5 that manages communication of the remote control apparatus 4. However, the remote control value generator 6 and the server 5 may be implemented by one computer 10.

The remote control value generator 6 may be basically provided, in one-to-one correspondence, for each of the multiple vehicles 2 that are managed by the remote control apparatus 4. In practice, however, one remote control value generator 6 may be provided for multiple vehicles 2 in one-to-many correspondence. The remote control value generator 6 in such a case may repeatedly generate, for each vehicle 2, the remote control value available for traveling control of each of the multiple vehicles 2. In this case, the remote control value generator 6 may be provided for each type of the vehicle 2. Different types of vehicles 2 are basically assumed to differ in traveling characteristics and traveling control characteristics.

The server 5 that manages the communication of the remote control apparatus 4 may be coupled to multiple remote control value generators 6 in one-to-many correspondence. In this case, the server 5 of the remote control apparatus 4 may manage communication with the multiple vehicles 2 for which the remote control values are to be generated by the multiple remote control value generators 6.

Figure 3:
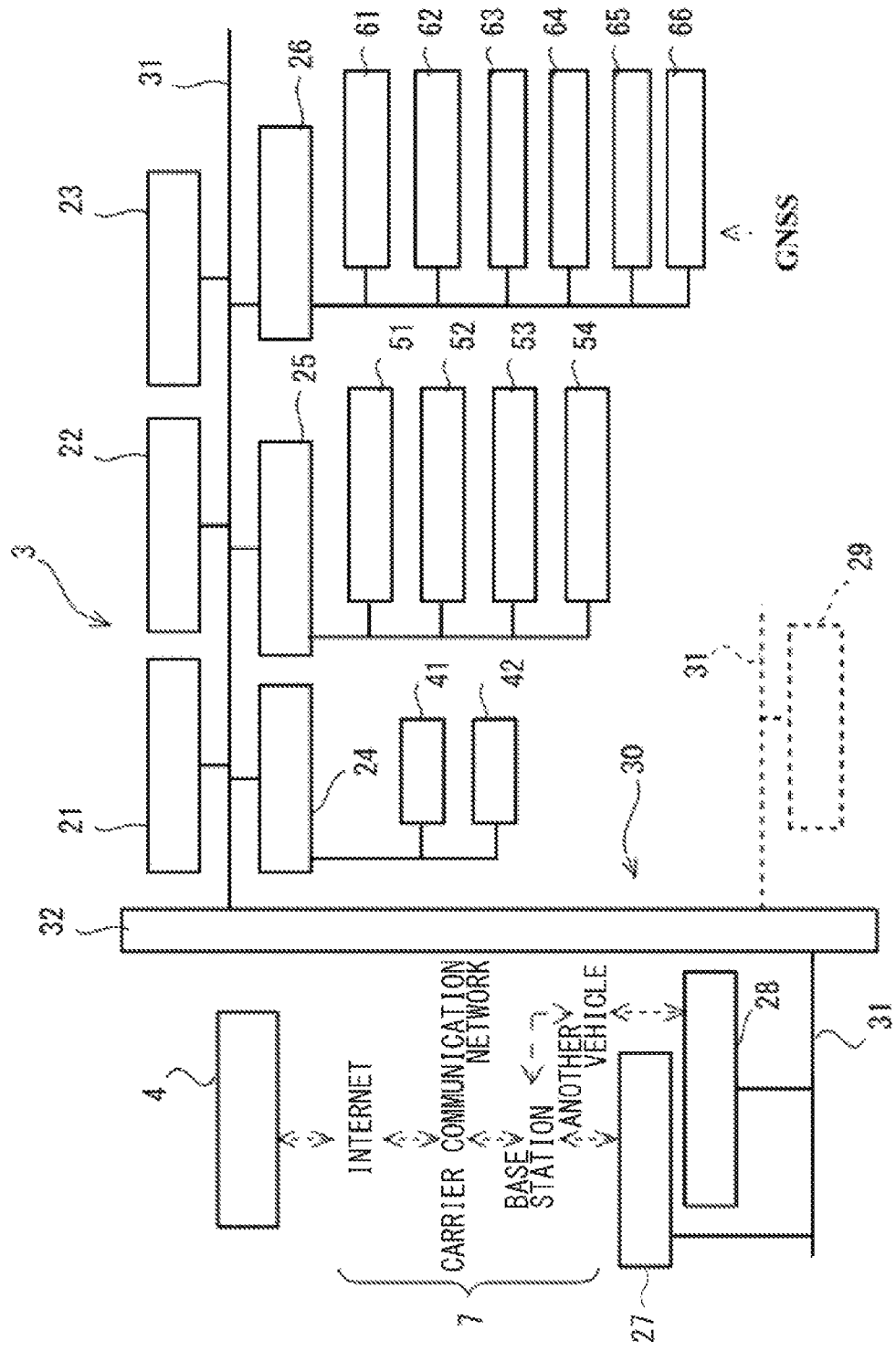
FIG. 3 is a configuration diagram illustrating a control system that controls the traveling of the vehicle illustrated in FIG. 1.

FIG. 3 is a configuration diagram illustrating the control system 3 that controls the traveling of the vehicle 2 illustrated in FIG. 1.

FIG. 3 illustrates, as representatives, respective control electronic control units (ECUs) incorporated in multiple control devices included in the control system 3 provided in the vehicle 2. As with the server 5 illustrated in FIG. 2, each of the control devices may include, in addition to the control ECU, for example, an unillustrated memory, an unillustrated input and output port, an unillustrated timer, and an unillustrated internal bus. The memory may hold a control program and data. The timer may measure a time period and a time. The memory, the input and output port, and the timer may be coupled to the internal bus.

FIG. 3 illustrates, as the control ECUs included in the control system 3 of the vehicle 2, for example, a driving ECU 21 for a driving device, a steering ECU 22 for the steering device, a braking ECU 23 for the braking device, the traveling control ECU 24, a driving operation ECU 25, a detection ECU 26, an AP communication ECU 27, and a V2V communication ECU 28. The control system 3 of the vehicle 2 may include another unillustrated control ECU.

The control ECUs may be coupled to a vehicle network 30 such as a controller area network (CAN) or a local interconnect network (LIN) used in the vehicle 2. The vehicle network 30 may include multiple bus cables 31 and a central gateway (CGW) 32. The bus cables 31 may allow the control ECUs to be coupled to each other. The central gateway (CGW) 32 may serve as a relay to which the bus cables 31 are coupled. Identifications (IDs) different from each other may be assigned to the control ECUs. The IDs may each serve as identification information. The control ECUs may each basically output data to other control ECUs periodically. The data may have an ID for one of the control ECUs and another ID for another one of the control ECUs. The one of the control ECUs may represent a source of output. The other one of the control ECUs may represent a destination of output. Each of the control ECUs may monitor the bus cables 31. In a case where an ID that represents a destination of output corresponds to the ID of one of the control ECUs, for example, the one of the control ECUs may acquire data, and execute processing on the basis of the data. The central gateway 32 may monitor each of the bus cables 31 coupled thereto. In a case where one of the control ECUs representing a source of output is coupled to one of the bus cables 31, another one of the control ECUs is coupled to another one of the bus cables 31, and the central gateway 32 detects that an ID representing a destination of output corresponds to the other one of the control ECUs, the central gateway 32 may output data to the other one of the bus cables 31. Through the relaying performed by the central gateway 32, while one of the control ECUs is coupled to one of the bus cables 31, and another one of the control ECUs is coupled to another one of the bus cables 31, exchanging of data to be inputted and outputted may be achieved between the one of the control ECUs and the other one of the control ECUs.

The driving operation ECU 25 may be coupled to operation members. The operation members may be used by the occupant to control the traveling of the vehicle 2. Non-limiting examples of the operation members may include a steering wheel 51, a brake pedal 52, an accelerator pedal 53, and a shift lever 54. As one of the operation members is operated, the driving operation ECU 25 may output data to the vehicle network 30. The data may include whether there is an operation and an amount of the operation. The driving operation ECU 25 may execute processing regarding the operation that is made on the one of the operation members. The driving operation ECU 25 may include a result of the processing in the data.

The detection ECU 26 may be coupled to own vehicle sensors configured to detect a traveling environment of the vehicle 2. Non-limiting examples of the own vehicle sensors may include a speed sensor 61, an acceleration sensor 62, a vehicle outside camera 63, a LIDAR 64, a vehicle inside camera 65, and a GNSS receiver 66. The speed sensor 61 may detect a speed of the vehicle 2. The acceleration sensor 62 may detect an acceleration rate of the vehicle 2. The vehicle outside camera 63 may capture an image of the outside of the vehicle 2. The LIDAR 64 may detect an object present outside the vehicle 2 by laser irradiation. The vehicle inside camera 65 may capture an image of the inside of the vehicle 2. The GNSS receiver 66 may detect the position of the vehicle 2. The vehicle outside camera 63 may be, for example, a stereo camera, a monocular camera, or a 360-degree camera. The GNSS receiver 66 may receive the radio waves from the GNSS satellites 110, as with the server GNSS receiver 12, to obtain a latitude, a longitude, and an altitude, indicating the current position of the own vehicle, and a current time. It is thus expected that the current time of the vehicle 2 match, with high precision, the current time based on the server GNSS receiver 12 of the server 5. The detection ECU 26 may output, to the vehicle network 30, for example, detection information acquired from the own vehicle sensor and a processing result based on the detection information. For example, the detection ECU 26 may execute a process of recognizing a pedestrian, a traffic light, another vehicle, and a shape of the road 100 outside the vehicle, included in a vehicle outside captured image of the vehicle outside camera 63, and output a result of the recognition to the vehicle network 30.

Note that the detection ECU 26 may be coupled to an occupant sensor other than the vehicle inside camera 65, such as a vehicle inside millimeter-wave sensor, a seating sensor, or a steering sensor.

The AP communication ECU 27 may be an AP communication device serving as the AP communicator. The AP communication ECU 27 may establish a wireless communication path between the vehicle 2 and the base station 9. In remote control, the AP communication ECU 27 may repeat transmission and reception of data to and from the server 5 of the remote control apparatus 4 by using the wireless communication path established with the base station 9.

The V2V communication ECU 28 may be a V2V communication device serving as a V2V communicator. The V2V communication ECU 28 may execute V2V communication between the vehicle 2 and another vehicle. The V2V communication ECU 28 may communicate with the other vehicle that has established a wireless communication path with the base station 9. This enables the V2V communication ECU 28 to, for remote control, repeat transmission and reception of data to and from the server 5 of the remote control apparatus 4 via the other vehicle.

The traveling control ECU 24 may be coupled to a memory 41 and a timer 42. The memory 41 may be a computer-readable recording medium. The memory 41 may hold, for example, a program to be executed by the traveling control ECU 24, and data. The memory 41 may hold, for example, data for driving assistance, such as lane keep control or inter-vehicle distance control, and the high-precision map data for automatic driving. The traveling control ECU 24 may read the program from the memory 41, and execute the program. This enables the traveling control ECU 24 to serve as a control unit configured to control the traveling of the vehicle 2.

The traveling control ECU 24 serving as the control unit that controls the traveling of the vehicle 2 may acquire information from each unit of the control system 3 of the vehicle 2 to control the traveling of the own vehicle.

Upon acquiring information on a manual operation of the occupant from, for example, the driving operation ECU 25, the traveling control ECU 24 may generate an own vehicle control value based on the manual operation of the occupant as it is, or generate the own vehicle control value finely adjusted to assist the manual operation of the occupant.

In automatic driving, for example, the traveling control ECU 24 may acquire information from the detection ECU 26, determine the own vehicle position on the high-precision map data and the possibility of coming into contact with another vehicle, and generate the own vehicle control value for the automatic driving. The automatic driving may be achieved by, for example, the own vehicle control value for steering and the own vehicle control value for acceleration or deceleration. The own vehicle control value for steering may be used for the lane keep control to keep a lateral position of the vehicle 2 near the middle of a lane. The own vehicle control value for acceleration or deceleration may be used to control a longitudinal position of the vehicle 2 to keep an inter-vehicle distance.

The traveling control ECU 24 may output these generated own vehicle control values to the driving ECU 21, the steering ECU 22, and the braking ECU 23 via the vehicle network 30.

This enables the traveling control ECU 24 to generate the own vehicle control value to be used for the traveling control of the vehicle 2 on the basis of the operation performed by the occupant of the own vehicle or the automatic driving. The traveling control ECU 24 may serve as an own vehicle control value generating unit.

In remotely controlling the traveling of the own vehicle, the traveling control ECU 24 serving as the control unit that controls the traveling of the vehicle 2 may communicate with the server 5 of the remote control apparatus 4 by using the AP communication ECU 27, and acquire the remote control value from the server 5. The traveling control ECU 24 may use the V2V communication ECU 28 in place of the AP communication ECU 27.

The remote control apparatus 4 may generate the remote control values equivalent to the above-described own vehicle control values to be generated by the traveling control ECU 24, by a process similar to a generation process to be performed for the automatic driving by the traveling control ECU 24.

The traveling control ECU 24 may output these acquired remote control values to the driving ECU 21, the steering ECU 22, and the braking ECU 23 via the vehicle network 30.

This enables the traveling control ECU 24 to execute the traveling control based on the remote control value repeatedly received from the remote control apparatus 4. In one embodiment, the traveling control ECU 24 may serve as a "remote traveling control unit".

The driving ECU 21 may receive a control value generated or acquired by the traveling control ECU 24. The driving ECU 21 may thereby control the acceleration of the vehicle 2 on the basis of the control value by controlling operation of a driving force source, such as the engine or the motor, of the vehicle 2.

The steering ECU 22 may receive a control value generated or acquired by the traveling control ECU 24. The steering ECU 22 may thereby control the traveling direction of the vehicle 2 on the basis of the control value by controlling operation of a steering force generator, such as a motor for the steering wheel 51, of the vehicle 2.

The braking ECU 23 may receive a control value generated or acquired by the traveling control ECU 24. The braking ECU 23 may thereby control the deceleration of the vehicle 2 on the basis of the control value by controlling operation of a braking force generator, such as a brake pump, of the vehicle 2.

Figure 4:
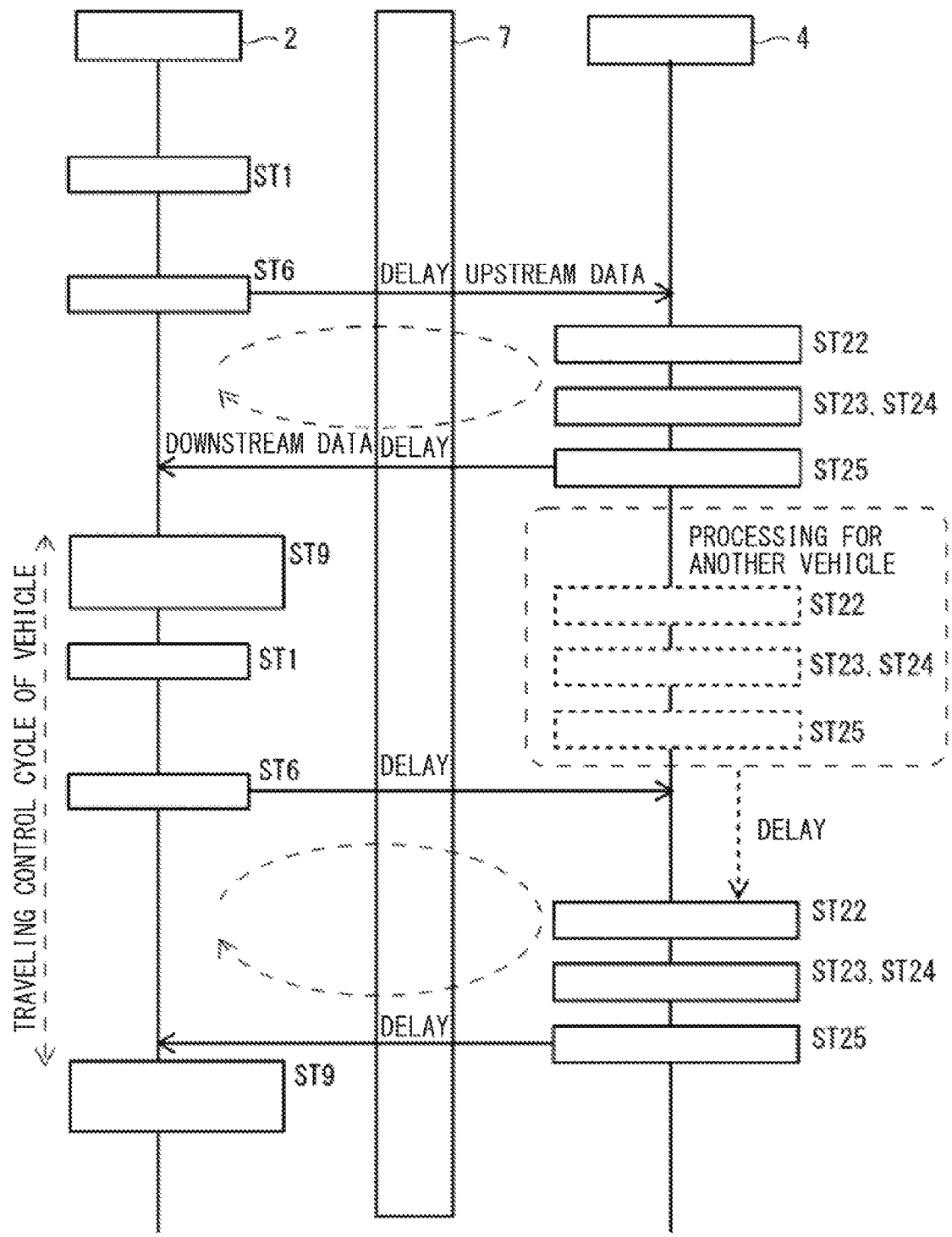
FIG. 4 is a timing chart illustrating a basic flow of remote control in the remote control system illustrated in FIG. 1.

FIG. 4 is a timing chart illustrating a basic flow of the remote control in the remote control system 1 illustrated in FIG. 1.

FIG. 4 illustrates an example in which one vehicle 2 repeatedly communicates with the remote control apparatus 4 via the communication system 7 including, for example, the communication network 8. The communication system 7 can involve delay in upstream data and downstream data. An amount of delay tends to fluctuate depending on the communication environment. In FIG. 4, time flows from the top to the bottom. Note that step numbers in FIG. 4 correspond to those in drawings to be described later.

In FIG. 4, the vehicle 2 may first acquire information on the own vehicle in step ST1, and transmit own vehicle information to the remote control apparatus 4 via the communication system 7 in step ST6. The vehicle 2 may transmit, to the remote control apparatus 4, at least the detection information of the own vehicle sensor and the latest position and time of the own vehicle. The detection information of the own vehicle sensor may include the vehicle outside captured image of the vehicle outside camera 63 mounted on the own vehicle.

The remote control apparatus 4 may receive such upstream data from the vehicle 2. Thereafter, the remote control apparatus 4 may acquire the latest own vehicle information regarding the vehicle 2 in step ST22. The remote control apparatus 4 may generate and acquire the remote control value by using the own vehicle information received from each vehicle 2 in step ST23 and step ST24, and transmit the acquired remote control value to the vehicle 2 via the communication system 7 in step ST25. The amount of delay from when the remote control apparatus 4 receives the upstream data from the vehicle 2 until when the remote control apparatus 4 transmits the downstream data including the remote control value tends to fluctuate, depending on remote processing load on the remote control apparatus 4 at that time.

The vehicle 2 may receive the downstream data from the remote control apparatus 4. Thereafter, the vehicle 2 may execute the traveling control based on the remote control value in step ST9. The vehicle 2 may acquire, from the remote control apparatus 4, the remote control value receivable by the traveling processor as with the own vehicle control value generated by the own vehicle, and execute the traveling control.

The vehicle 2 and the remote control apparatus 4 may repeat the series of processes described above. This enables the vehicle 2 to receive multiple remote control values repeatedly transmitted from the remote control apparatus 4, and continuously execute the traveling control based on the remote control value. The vehicle 2 is able to travel on the basis of the remote control, by executing the traveling control of the vehicle 2 in a traveling control cycle corresponding to a reception cycle of the multiple remote control values transmitted from the remote control apparatus 4.

In this manner, the remote control apparatus 4 may periodically acquire the remote control value available for the traveling control of the vehicle 2 and transmit the remote control value to the vehicle 2, on the basis of the own vehicle information received from the vehicle 2.

In addition, each vehicle 2 may periodically and repeatedly receive the remote control value generated by the remote control apparatus 4 on the basis of the own vehicle information that the vehicle 2 has transmitted to the remote control apparatus 4, and periodically execute the traveling control using the remote control value.

The remote control apparatus 4 may generate, for example, a remote control value available as it is for the traveling control as received by the vehicle 2.

Non-limiting examples of such a remote control value may include at least a steering amount that may be received by the steering ECU 22 to be used to control steering of the vehicle 2. Other non-limiting examples of the remote control value may include an acceleration or deceleration control amount that may be received by the driving ECU 21 or the braking ECU 23 to be used to control acceleration or deceleration of the vehicle 2.

In addition, the remote control value generator 6 according to the example embodiment may generate, in addition to these control amounts to be used to directly control the traveling itself of the vehicle 2, a remote control value to be used to control a lighting state of an exterior lamp such as a turn signal lamp to enhance safety of the traveling of the vehicle 2. The exterior lamp such as the turn signal lamp may be controlled from an off state to an on state or a blinking state in, for example, a case where the vehicle 2 makes a right or left turn and a case where the vehicle 2 decelerates to stop.

Although the remote control apparatus 4 to be used for such remote control may be provided in one-to-one correspondence with the vehicle 2, the remote control apparatus 4 may be, for example, provided in one-to-many correspondence with the vehicles 2.

In this case, the remote control apparatus 4 may have to repeatedly transmit the remote control value described above, for each of multiple vehicles 2 and periodically for each vehicle 2. This places heavy processing load on the remote control apparatus 4. As indicated by a dashed line in FIG. 4, if it takes time for processing for another vehicle, subsequent timing of transmitting the remote control value can be delayed.

If each vehicle 2 becomes unable to periodically keep receiving the remote control value at an appropriate time interval corresponding to the traveling control cycle in the own vehicle, it can become difficult for each vehicle 2 to keep appropriate traveling based on the control using the remote control value. For example, if a reception interval of the remote control value exceeds the traveling control cycle of the vehicle 2, it can become difficult for the vehicle 2 to constantly continue the traveling control using the remote control value.

Thus, it may be desired to improve remote traveling control of the vehicle 2.

Figure 5:
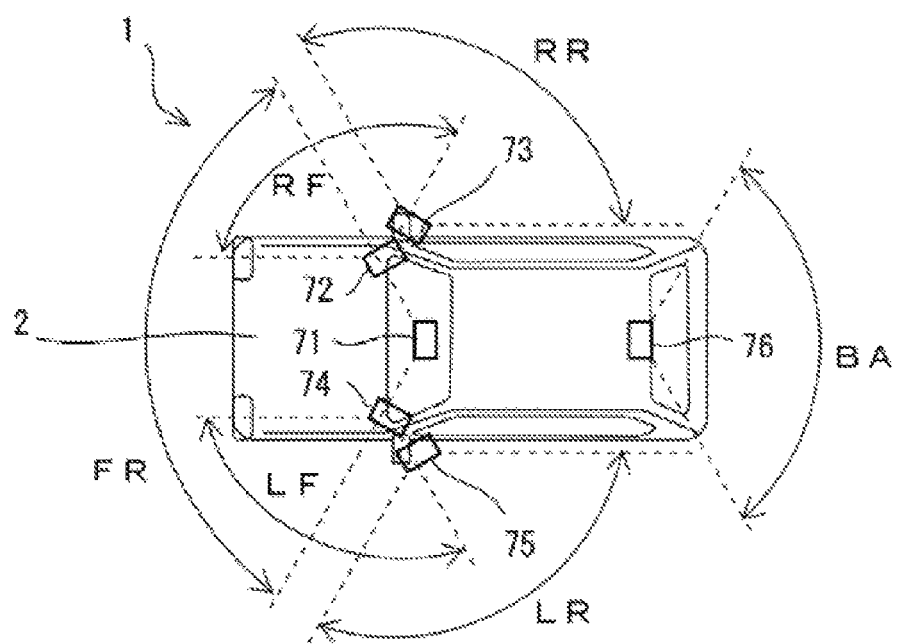
FIG. 5 is an explanatory diagram illustrating an example of vehicle outside cameras mounted on the vehicle illustrated in FIG. 1.

FIG. 5 is an explanatory diagram illustrating an example of multiple vehicle outside cameras 63 mounted on the vehicle 2 illustrated in FIG. 1.

FIG. 5 illustrates, as the vehicle outside cameras 63, a front vehicle outside camera 71, a right-front vehicle outside camera 72, a right-rear vehicle outside camera 73, a left-front vehicle outside camera 74, a left-rear vehicle outside camera 75, and a rear vehicle outside camera 76. In the following, the front vehicle outside camera 71, the right-front vehicle outside camera 72, the right-rear vehicle outside camera 73, the left-front vehicle outside camera 74, the left-rear vehicle outside camera 75, and the rear vehicle outside camera 76 may be collectively referred to as vehicle outside cameras 71 to 76.

The vehicle 2 may be provided with the vehicle outside cameras 63 to, for example, capture images of a surrounding environment outside the vehicle 2 during traveling based on automatic driving or driving assistance, or ensure safety against contact during manual driving performed by a driver who drives the vehicle 2.

The front vehicle outside camera 71 may be provided frontward in a front part of the vehicle 2. In FIG. 5, the front vehicle outside camera 71 may be provided in a vehicle compartment of the vehicle 2, for example, on a middle part of a front edge of the vehicle 2's roof. The front vehicle outside camera 71 may image a range on a front side of the vehicle 2 to generate a front-side vehicle outside captured image FR of the vehicle 2.

The right-front vehicle outside camera 72 may be provided frontward on a right side of the vehicle 2. In FIG. 5, the right-front vehicle outside camera 72 may be provided in the vehicle compartment of the vehicle 2, for example, on a right end part of a dashboard. The right-front vehicle outside camera 72 may image a range on a right-front side of the vehicle 2 to generate a right-front-side vehicle outside captured image RF of the vehicle 2. Note that the right-front vehicle outside camera 72 may be provided on a right-front door or a door mirror.

The right-rear vehicle outside camera 73 may be provided rearward on the right side of the vehicle 2. In FIG. 5, the right-rear vehicle outside camera 73 may be provided on the vehicle 2, for example, on the right-front door or the door mirror serving as an openable and closable exterior member. The right-rear vehicle outside camera 73 may image a range on a right-rear side of the vehicle 2 to generate a right-rear-side vehicle outside captured image RR of the vehicle 2.

The left-front vehicle outside camera 74 may be provided frontward on a left side of the vehicle 2. In FIG. 5, the left-front vehicle outside camera 74 may be provided in the vehicle compartment of the vehicle 2, for example, on a left end part of the dashboard. The left-front vehicle outside camera 74 may image a range on a left-front side of the vehicle 2 to generate a left-front-side vehicle outside captured image LF of the vehicle 2. Note that the left-front vehicle outside camera 74 may be provided on a left-front door or a door mirror.

The left-rear vehicle outside camera 75 may be provided rearward on the left side of the vehicle 2. In FIG. 5, the left-rear vehicle outside camera 75 may be provided on the vehicle 2, for example, on the left-front door or the door mirror serving as an openable and closable exterior member. The left-rear vehicle outside camera 75 may image a range on a left-rear side of the vehicle 2 to generate a left-rear-side vehicle outside captured image LR of the vehicle 2.

The rear vehicle outside camera 76 may be provided rearward in a rear part of the vehicle 2. In FIG. 5, the rear vehicle outside camera 76 may be provided on the vehicle 2, for example, on an upper middle part of a rear gate serving as an openable and closable exterior member. The rear vehicle outside camera 76 may image a range on a rear side of the vehicle 2 to generate a rear-side vehicle outside captured image BA of the vehicle 2.

These vehicle outside cameras 71 to 76 illustrated in FIG. 5 may be able to image a 360-degree range outside the vehicle 2, divided into multiple ranges. An imaging range of each of the vehicle outside cameras 71 to 76 may overlap with an imaging range of another one of the vehicle outside cameras 71 to 76 that images an adjacent range. If the control system 3 of the vehicle 2 predicts contact or predicts lane departure, for example, on the basis of the vehicle outside captured images obtained by the vehicle outside cameras 71 to 76, the control system 3 may execute traveling control for avoidance of such an event.

In addition, the own vehicle information that the vehicle 2 transmits to the server 5 for the remote control may, for example, include all of the vehicle outside captured images obtained by these vehicle outside cameras 71 to 76. This enables the remote control apparatus 4 to obtain the vehicle outside captured images of the entire surroundings of the vehicle 2 from each vehicle 2, determine a traveling situation of each vehicle 2, and generate a remote control value suitable for the traveling situation of each vehicle 2.

Figure 6:
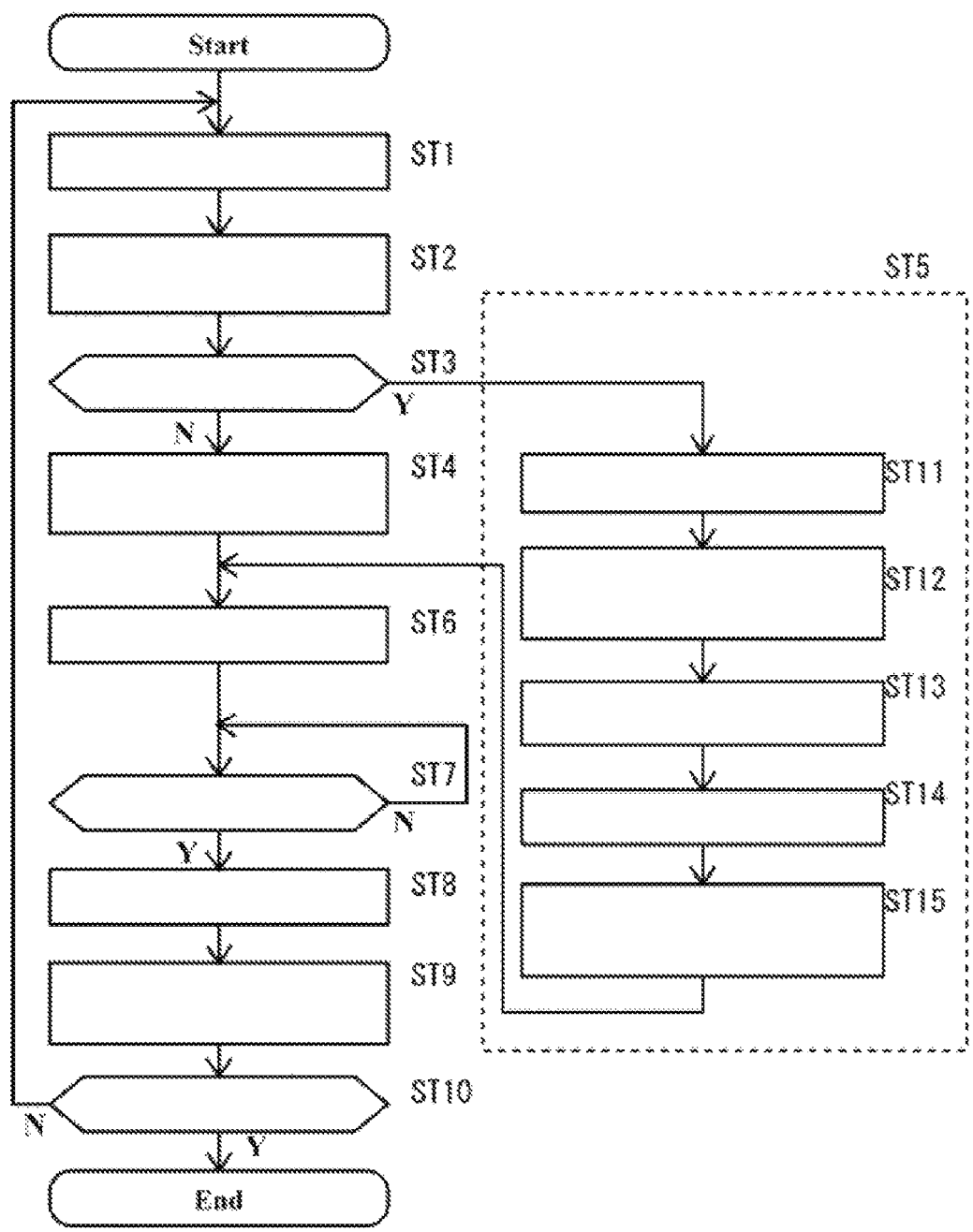
FIG. 6 is a flowchart illustrating remote traveling control according to one example embodiment to be performed by the control system of the vehicle illustrated in FIG. 1.

FIG. 6 is a flowchart illustrating remote traveling control according to the first example embodiment to be performed by the control system 3 of the vehicle 2 illustrated in FIG. 1.

The traveling control ECU 24, for example, of the control system 3 of the vehicle 2 may repeatedly execute the remote traveling control illustrated in FIG. 6 to control the traveling of the own vehicle.

Note that a control ECU other than the traveling control ECU 24 of the control system 3 of the vehicle 2, such as a remote control ECU 29 indicated by a dashed line in FIG. 3, may repeatedly execute the remote traveling control illustrated in FIG. 6. The same applies to control illustrated in each of the following flowcharts.

Step ST1 may be a step of acquiring the own vehicle information. The traveling control ECU 24 of the control system 3 of the vehicle 2 may acquire the own vehicle information detected by the own vehicle. The own vehicle information may include at least the vehicle outside captured image of the vehicle outside camera 63 mounted on the own vehicle, the latest position and time of the own vehicle obtained by the GNSS receiver 66, the speed, the acceleration rate, the steering amount, and information on the lighting state of the exterior lamp, for example.

Step ST2 may be a step of acquiring a communication situation or a remote processing situation. During the remote control, the traveling control ECU 24 may acquire information regarding the communication situation between the communication device of the own vehicle and the remote control apparatus 4 or the remote processing situation of the remote control apparatus 4. The traveling control ECU 24 may acquire, as such information, a reception interval between the pieces of downstream data received multiple times in FIG. 4. Upon receiving a remote control value, the traveling control ECU 24 may record and accumulate the received remote control value in the memory 41 together with a reception time measured by the timer 42. In this case, the traveling control ECU 24 is able to acquire the reception interval of the remote control value from the memory 41.

Step ST3 may be a step of determining influence on the traveling control on the basis of the various pieces of acquired information described above. The traveling control ECU 24 may determine whether the communication situation between the own vehicle and the remote control apparatus 4 or the remote processing situation of the remote control apparatus 4 can influence periodic traveling control using the remote control value in the own vehicle.

The traveling control ECU 24 may basically have to execute the traveling control based on the remote control value in a constant traveling control cycle, as illustrated in FIG. 4. In this case, the traveling control ECU 24 may determine, with reference to the traveling control cycle, whether a time difference (surplus time) of the reception interval of the remote control value is smaller than a predetermined threshold. If the time difference is smaller than the threshold (ST3: Y), the traveling control ECU 24 may determine that the remote traveling control can be influenced, and cause the flow to proceed to step ST5. If the time difference is the threshold or more (ST3: N), the traveling control ECU 24 may determine that the remote traveling control is unlikely to be influenced, and cause the flow to proceed to step ST4.

Step ST4 may be a step of selecting all vehicle outside captured images. The traveling control ECU 24 may select all of the vehicle outside captured images obtained by the vehicle outside cameras 63 as a transmission target. Thereafter, the traveling control ECU 24 may cause the flow to proceed to step ST6.

Step ST5 may be a step of selecting a vehicle outside captured image. The traveling control ECU 24 may select only some of the vehicle outside captured images obtained by the vehicle outside cameras 63 as a transmission target. Thereafter, the traveling control ECU 24 may cause the flow to proceed to step ST6.

Step ST6 may be a step of transmitting the own vehicle information. The traveling control ECU 24 may transmit the acquired own vehicle information to the remote control apparatus 4. The traveling control ECU 24 may transmit the own vehicle information to the remote control apparatus 4 by using the communication path established by the AP communication ECU 27 or the communication path established by the V2V communication ECU 28. The own vehicle information transmitted from the vehicle 2 may be received by the server communication device 11 of the server 5 of the remote control apparatus 4 via, for example, the base station 9, the carrier communication network, and the Internet. The remote control apparatus 4 may use the own vehicle information received from each vehicle 2 to generate a remote control value for the vehicle 2, and transmit the remote control value to the vehicle 2 that has transmitted the own vehicle information.

Step ST7 may be a step of waiting for reception of a remote control value. The traveling control ECU 24 may wait for reception of a remote control value serving as the downstream data from the remote control apparatus 4. The traveling control ECU 24 may repeat this process until a remote control value is received from the remote control apparatus 4. If the AP communication ECU 27 or the V2V communication ECU 28 receives a remote control value transmitted as the downstream data from the remote control apparatus 4 to the own vehicle (ST7: Y), the traveling control ECU 24 may cause the flow to proceed to step ST8.

Step ST8 may be a step of recording the reception time. The traveling control ECU 24 may record the reception time. Upon receiving the remote control value, the traveling control ECU 24 may record and accumulate the received remote control value in the memory 41 together with the reception time measured by the timer 42. The traveling control ECU 24 may additionally record and accumulate the position at the time of reception in the memory 41.

Step ST9 may be a step of executing the traveling control based on the remote control value. The traveling control ECU 24 may execute the traveling control based on the remote control value acquired from the remote control apparatus 4 by the reception. The traveling control ECU 24 may output the remote control value received for the remote control to, for example, the driving ECU 21, the steering ECU 22, and the braking ECU 23. The driving ECU 21, the steering ECU 22, and the braking ECU 23 may each execute the traveling control on the basis of the received remote control value. This enables the traveling of the vehicle 2 to be controlled by the remote control value generated by the remote control apparatus 4.

Step ST10 may be a step of determining the end of the remote control. The traveling control ECU 24 may determine whether to end the traveling control. For example, in a case where the occupant operates an unillustrated ignition switch, the traveling control ECU 24 may determine to end the traveling control, and end this control. If the traveling control ECU 24 does not end the traveling control (ST10: N), the traveling control ECU 24 may cause the flow to return to step ST1. The traveling control ECU 24 may repeatedly execute, for example, the remote traveling control described above until the traveling control ECU 24 determines to end the traveling control in step ST10. This enables the traveling of the vehicle 2 to keep being controlled by the remote control values repeatedly generated by the remote control apparatus 4.

Next, a vehicle outside captured image selection process in step ST5 described above is described in detail.

Step ST11 may be a step of acquiring the traveling environment. The traveling control ECU 24 may acquire information regarding the traveling environment of the own vehicle. The traveling control ECU 24 may acquire information regarding a surrounding object acquirable by analysis of a vehicle outside captured image.

Step ST12 may be a step of acquiring the past remote control value as traveling control information. The traveling control ECU 24 may acquire information regarding a traveling control situation. The traveling control ECU 24 may acquire the past remote control values held in the memory 41, together with the reception time of each remote control value and information on the position at the time of reception of each remote control value.

Step ST13 may be a step of estimating a future course. The traveling control ECU 24 may estimate a course of the own vehicle in the immediate future. The traveling control ECU 24 may estimate, on the basis of the past remote control values acquired in step ST12, that the vehicle 2 will travel in a direction extended from the past remote control values, to estimate the course of the own vehicle in the immediate future.

For example, in a case where a remote control value for blinking of the exterior lamp has been received from the remote control apparatus 4, together with the steering amount and the acceleration or deceleration control amount to be used to control the traveling itself of the vehicle 2, the traveling control ECU 24 is able to easily estimate a course of a right turn or a left turn at an intersection. For example, it can be unclear, from only the traveling control information indicating that the own vehicle is decelerating at a place such as before an intersection, whether the own vehicle is thereafter about to travel straight through the intersection or is about to make a right turn or a left turn. In a case of making a right turn or a left turn at the intersection, the vehicle 2 may have to execute control of blinking the turn signal lamp on a turning side. By receiving such a remote control value for blinking of the exterior lamp such as the turn signal lamp, the traveling control ECU 24 is able to reliably estimate whether the own vehicle is about to travel straight through the intersection or is about to make a right turn or a left turn.

Step ST14 may be a step of determining the traveling situation. The traveling control ECU 24 may determine the traveling situation of the own vehicle. The vehicle 2 may not only travel straight along the road 100 at a constant speed, but also travel to make a lane change, travel to merge with another road 100 in a merging section, travel to branch off to another road 100, or travel toward an intersection. The traveling control ECU 24 may determine, on the basis of the information acquired in step ST11 to step ST13, to which of these traveling situations the traveling situation of the own vehicle corresponds.

Step ST15 may be a step of selecting some vehicle outside captured images depending on the traveling situation. The traveling control ECU 24 may select the vehicle outside captured image to be transmitted to the remote control apparatus 4, depending on the course and the traveling situation estimated for the own vehicle. The traveling control ECU 24 may select, as the vehicle outside captured image to be transmitted, only some of the vehicle outside captured images of the vehicle outside cameras 63 mounted on the own vehicle.

In a case where a request regarding the vehicle outside captured image to be selected for transmission has been received from the server 5 of the remote control apparatus 4, the traveling control ECU 24 may select some images including the vehicle outside captured image relevant to the request. The server 5 of the remote control apparatus 4 may be able to determine, on its own, for which direction or range the vehicle outside captured image is desired, and transmit a request for the vehicle outside captured image to the vehicle 2, for example, as in a third example embodiment to be described later. In this case, the traveling control ECU 24 may select some images corresponding to the traveling situation to include the vehicle outside captured image selected and requested by the server 5 of the remote control apparatus 4.

This enables the traveling control ECU 24 to select only some of the vehicle outside captured images of the vehicle outside cameras 63 mounted on the own vehicle, depending on the traveling situation, e.g., the traveling control situation and the traveling environment, of the own vehicle.

In addition, in step ST6, the amount of information of the own vehicle information that the traveling control ECU 24 transmits from the vehicle 2 to the remote control apparatus 4 is reduced, as compared with a case where the own vehicle information includes all of the vehicle outside captured images obtained by the vehicle outside cameras 63 mounted on the own vehicle. This allows transmission of the own vehicle information to end in short time.

As described above, the traveling control ECU 24 is provided in the vehicle 2, and periodically transmits the own vehicle information to the remote control apparatus 4. The own vehicle information may include at least the vehicle outside captured images of the vehicle outside cameras 63 mounted on the own vehicle and the position and the time of the own vehicle. In one embodiment, the traveling control ECU 24 may serve as a "transmission control unit".

In addition, the traveling control ECU 24 selects some of the vehicle outside captured images, depending on one or more of the communication situation between the communication device of the vehicle 2 and the remote control apparatus 4, the processing situation of the remote control apparatus 4, and the traveling situation, e.g., the traveling control situation and the traveling environment, of the own vehicle. The traveling control ECU 24 transmits some vehicle outside captured images thus selected.

Figure 7:
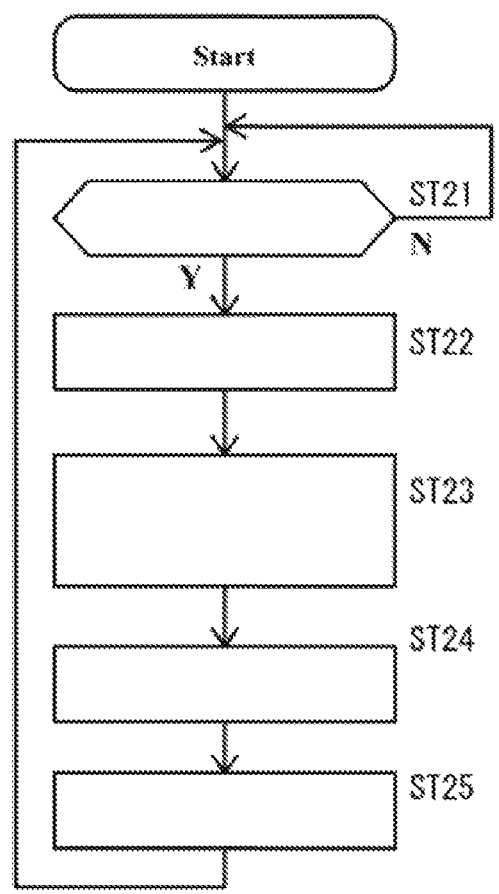
FIG. 7 is a flowchart illustrating remote control according to one example embodiment to be performed by the server of the remote control apparatus illustrated in FIG. 1.

FIG. 7 is a flowchart illustrating remote control according to the first example embodiment to be performed by the server 5 of the remote control apparatus 4 illustrated in FIG. 1.

The server CPU 15 of the server 5 of the remote control apparatus 4 may repeat the remote control illustrated in FIG. 7.

Step ST21 may be a step of determining presence or absence of unprocessed received own vehicle information. The server CPU 15 of the server 5 of the remote control apparatus 4 may determine whether unprocessed received own vehicle information is present. If unprocessed own vehicle information is absent (ST21: N), the server CPU 15 may repeat this process. If unprocessed own vehicle information is present (ST21: Y), the server CPU 15 may cause the flow to proceed to step ST22 to process the unprocessed own vehicle information.

Step ST22 may be a step of acquiring the own vehicle information. The server CPU 15 may acquire the unprocessed own vehicle information of the vehicle 2.

Step ST23 may be a step of giving an instruction for generation of a remote control value based on the vehicle outside captured image acquired from each vehicle. The server CPU 15 may give the own vehicle information to the remote control value generator 6 coupled to the server 5 of the remote control apparatus 4, and instruct the remote control value generator 6 to generate a remote control value. The remote control value generator 6 may generate the remote control value by using the given own vehicle information. The remote control value generator 6 may generate the remote control value for each vehicle 2, on the basis of the vehicle outside captured image of the vehicle outside camera 63, for example, included in the own vehicle information of each vehicle 2. The remote control value generator 6 may generate the remote control value available as it is for the lane keep control or the inter-vehicle distance control, for example, as the remote control value available to the vehicle 2 that has transmitted the own vehicle information, by a process similar to the process to be performed by the traveling control ECU 24 of the vehicle 2. The remote control value generator 6 may output the generated remote control value to the server 5.

Step ST24 may be a step of acquiring the remote control value. The server CPU 15 may acquire, from the remote control value generator 6, the remote control value generated by the remote control value generator 6. The remote control value generated by the remote control value generator 6 may include the steering amount that may be received by the steering ECU 22 of the vehicle 2 to be used to control the steering of the vehicle 2. The remote control value may also include, for example, the acceleration or deceleration control amount that may be received by the driving ECU 21 or the braking ECU 23 to be used to control the acceleration or deceleration of the vehicle 2, and the remote control value to be used to control the lighting state of the exterior lamp such as the turn signal lamp of the vehicle 2.

Step ST25 may be a transmission step. The server CPU 15 may transmit the remote control value to the relevant vehicle 2 that has transmitted the own vehicle information. The control system 3 of the vehicle 2 that has transmitted the own vehicle information may be in a reception wait state for the remote control value in step ST7, after having transmitted the own vehicle information in step ST6 of FIG. 6. The control system 3 of the vehicle 2 that has transmitted the own vehicle information may execute the remote traveling control by using the remote control value received from the server 5 in step ST9.

Thereafter, the server CPU 15 may cause the flow to return to step ST21. The server CPU 15 of the server 5 of the remote control apparatus 4 may thus repeat the remote control illustrated in FIG. 7. This enables the server CPU 15 to keep generating and transmitting the remote control value based on the latest own vehicle information of each vehicle 2 repeatedly, for each of the vehicles 2. The server CPU 15 may keep generating, for example, a steering amount remote control value for the lane keep control, and an acceleration or deceleration amount remote control value for the inter-vehicle distance control or vehicle speed control.

Figure 8:
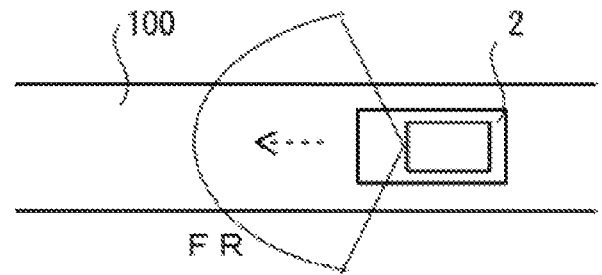
FIG. 8 is an explanatory diagram illustrating correspondence between a traveling situation of the vehicle illustrated in FIG. 1 and selection of some of vehicle outside captured images of the vehicle outside cameras.
Figure 8:
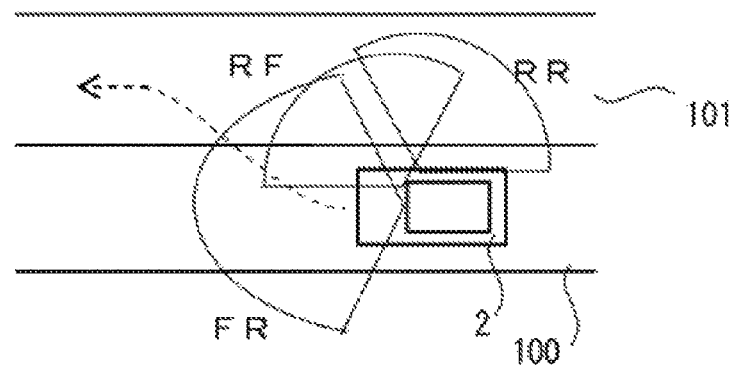
Figure 8:
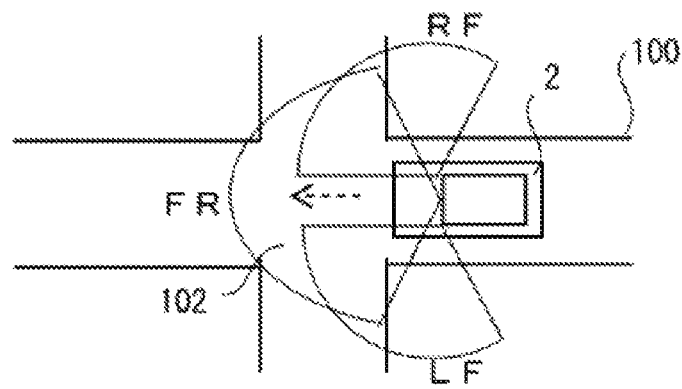

FIG. 8 is an explanatory diagram illustrating correspondence between the traveling situation of the vehicle 2 illustrated in FIG. 1 and selection of some of the vehicle outside captured images of the vehicle outside cameras 63.

FIG. 8 illustrates traveling situations in cases 1 to 3.

Case 1 may be a situation in which the vehicle 2 is traveling on the straight road 100. In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in a situation of traveling on the straight road 100, and select, in step ST15, only the front-side vehicle outside captured image FR corresponding to the traveling direction of the own vehicle, as the image to be transmitted.

In case 1, the amount of information of the image included in the own vehicle information from the vehicle 2 to the remote control apparatus 4 is thus reduced, allowing transmission of the upstream data to end in short time. Accordingly, the remote control apparatus 4 is able to generate a remote control value and transmit the remote control value to the vehicle 2 at early timing. In the example embodiment, the time difference of the reception interval of the remote control value with respect to the traveling control cycle in the vehicle 2 is expected to widen. Consequently, even in a case where communication load between the vehicle 2 and the remote control apparatus 4 is high or the processing load on the remote control apparatus 4 is high, the vehicle 2 is able to keep receiving the remote control value without lagging behind the traveling control cycle. This enables the vehicle 2 to stably continue the remote traveling control.

In addition, the vehicle 2 may control its traveling by using the remote control value generated by the remote control apparatus 4 on the basis of the front-side vehicle outside captured image FR corresponding to the traveling direction. This enables the vehicle 2 to continue the traveling based on the remote control along the straight road 100 on which the vehicle 2 is traveling.

Case 2 may be a situation in which the vehicle 2 is traveling to make a lane change from a traveling lane toward a passing lane 101, on the road 100 having two lanes on each side. In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in a situation of traveling to make a lane change. In step ST15, the traveling control ECU 24 may select, as the image to be transmitted, only the front-side vehicle outside captured image FR corresponding to the traveling direction of the own vehicle, the right-front-side vehicle outside captured image RF obtained on the side of the lane to which the lane change is to be made, and the right-rear-side vehicle outside captured image RR obtained on the side of the lane to which the lane change is to be made.

In case 2, the amount of information of the image included in the own vehicle information from the vehicle 2 to the remote control apparatus 4 is thus reduced, allowing transmission of the upstream data to end in short time. Accordingly, the remote control apparatus 4 is able to generate a remote control value and transmit the remote control value to the vehicle 2 at early timing. In the example embodiment, the time difference of the reception interval of the remote control value with respect to the traveling control cycle in the vehicle 2 is expected to widen. Consequently, even in a case where communication load between the vehicle 2 and the remote control apparatus 4 is high or the processing load on the remote control apparatus 4 is high, the vehicle 2 is able to keep receiving the remote control value without lagging behind the traveling control cycle. This enables the vehicle 2 to stably continue the remote traveling control at the time of the lane change.

In addition, the vehicle 2 may control its traveling by using the remote control value generated by the remote control apparatus 4 on the basis of, the front-side vehicle outside captured image FR corresponding to the traveling direction, and the right-front-side vehicle outside captured image RF and the right-rear-side vehicle outside captured image RR obtained on the side of the lane to which the lane change is to be made. This enables the vehicle 2 to execute the traveling based on the remote control to make the lane change from the traveling lane toward the passing lane 101.

Note that, in a case where the vehicle 2 makes a lane change for merging in a merging section of two roads 100, the traveling control ECU 24 may select the vehicle outside captured image on the basis of a pattern similar to that in case 2 described above.

In a case where the vehicle 2 makes a lane change to branch off the first road 100 to the second road 100, the traveling control ECU 24 may select the vehicle outside captured image on the basis of a pattern similar to that in case 2 described above.

Case 3 may be a situation in which the vehicle 2 is traveling on the straight road 100 toward an intersection 102. In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in a situation of traveling toward the intersection 102. In step ST15, the traveling control ECU 24 may select, as the image to be transmitted, only the front-side vehicle outside captured image FR corresponding to the traveling direction of the own vehicle, the right-front-side vehicle outside captured image RF, and the left-front-side vehicle outside captured image LF.

In case 3, the amount of information of the image included in the own vehicle information from the vehicle 2 to the remote control apparatus 4 is thus reduced, allowing transmission of the upstream data to end in short time. Accordingly, the remote control apparatus 4 is able to generate a remote control value and transmit the remote control value to the vehicle 2 at early timing. In the example embodiment, the time difference of the reception interval of the remote control value with respect to the traveling control cycle in the vehicle 2 is expected to widen. Consequently, even in a case where the communication load between the vehicle 2 and the remote control apparatus 4 is high, the vehicle 2 is able to keep receiving the remote control value without lagging behind the traveling control cycle, and stably continue the remote traveling control at the time of passing through the intersection 102. Even in a case where the processing load on the remote control apparatus 4 is high, the vehicle 2 is able to keep receiving the remote control value without lagging behind the traveling control cycle, and stably continue the remote traveling control at the time of passing through the intersection 102.

In addition, the vehicle 2 may control its traveling by using the remote control value based on the front-side vehicle outside captured image FR, the right-front-side vehicle outside captured image RF, and the left-front-side vehicle outside captured image LF, which are able to represent the situation of the road 100 intersecting at the intersection 102 present on the front side in the traveling direction. This enables the vehicle 2 to execute the traveling based on the remote control to pass through the intersection 102 safely.

As described above, in the example embodiment, the traveling control ECU 24 of the vehicle 2, serving as the transmission control unit, periodically transmits the own vehicle information to the remote control apparatus 4. The own vehicle information may include at least the vehicle outside captured images of the vehicle outside cameras 63 mounted on the own vehicle and the position and the time of the own vehicle.

In addition, the traveling control ECU 24 determines whether the communication situation between the communication device of the own vehicle and the remote control apparatus 4 or the processing situation of the remote control apparatus 4 influences the periodic traveling control using the remote control value in the own vehicle. In a case where the traveling control ECU 24 determines that the communication situation or the processing situation influences the traveling control, the traveling control ECU 24 selects only at least one of the vehicle outside captured images of the vehicle outside cameras 63 mounted on the own vehicle, depending on the traveling situation of the own vehicle, and transmits the selected vehicle outside captured image to the remote control apparatus 4.

Thus, in the example embodiment, it is possible to reduce the amount of information of the upstream data from the vehicle 2 to the remote control apparatus 4 and end the transmission of the upstream data early, as compared with a case of transmitting the own vehicle information including all of the vehicle outside captured images of the vehicle outside cameras 63 mounted on the own vehicle. This enables the remote control apparatus 4 to generate the remote control value available for the traveling control of the vehicle 2 early, on the basis of the own vehicle information received in such a manner that the transmission ends early, and transmit the remote control value to the vehicle 2 early. Consequently, it becomes easier for the traveling control ECU 24 of the control system 3 of the vehicle 2, serving as the remote traveling control unit, to receive the remote control value from the remote control apparatus 4 without delay. This enables the traveling control ECU 24 to stably continue the periodic traveling control using the remote control value.

The traveling control ECU 24 of the control system 3 of the vehicle 2 according to the example embodiment may select the vehicle outside captured image to be transmitted depending on the traveling situation of the own vehicle, not randomly, from the vehicle outside captured images of the vehicle outside cameras 63 mounted on the own vehicle. Thus, even if the remote control apparatus 4 has received the own vehicle information excluding the rest of the vehicle outside captured images from the vehicle 2, the remote control apparatus 4 is able to generate a useful remote control value favorably corresponding to the traveling situation of the vehicle 2. The traveling control ECU 24 of the control system 3 of the vehicle 2 is able to, for example, continuously execute the traveling control using the remote control value based on the own vehicle information after the exclusion of the rest of the vehicle outside captured images, subsequently to the traveling control using the remote control value based on the own vehicle information before the exclusion of the rest of the vehicle outside captured images. Moreover, the traveling control ECU 24 is expected to be able to keep control continuity to prevent the traveling control from greatly changing between such controls.

In the example embodiment, the vehicle 2 may select the vehicle outside captured image to be transmitted to the remote control apparatus 4, by determining the influence exerted by the communication situation between the communication device of the vehicle 2 and the remote control apparatus 4 or the processing situation of the remote control apparatus 4. Thus, in the example embodiment, it is unnecessary to add a process for such determination in the remote control apparatus 4. This helps to prevent loss of the effect of reducing the processing load and the communication load on the remote control apparatus 4 achieved by reducing the amount of information of the own vehicle information.

Second Example Embodiment

Described next is the remote control system 1 for the traveling of the vehicle 2 according to a second example embodiment of the disclosure.

The remote control system 1 according to the example embodiment may not only simply determine the traveling situation of the own vehicle, but also determine a traveling phase in the traveling situation, and dynamically change selection of the vehicle outside captured image depending on the traveling phase. Mainly described below are differences from the example embodiments described above.

Figure 9:
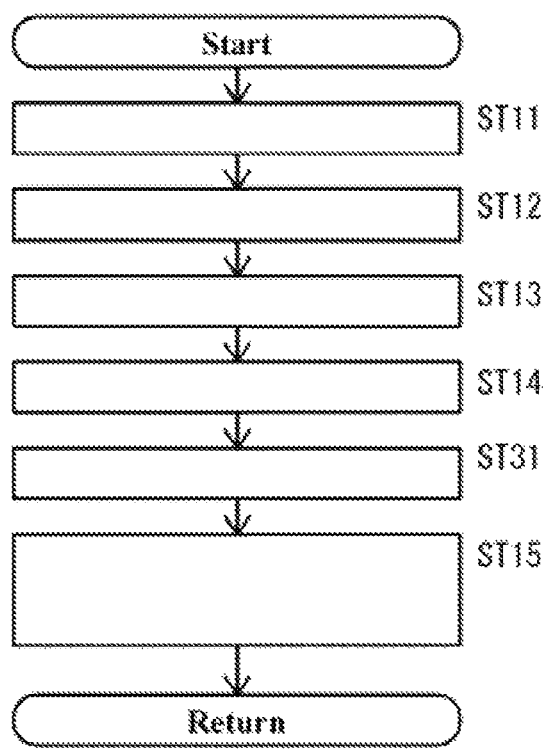
FIG. 9 is a flowchart illustrating a vehicle outside captured image selection process according to one example embodiment to be performed by the control system of the vehicle illustrated in FIG. 1.

FIG. 9 is a flowchart illustrating a vehicle outside captured image selection process according to the second example embodiment to be performed by the control system 3 of the vehicle 2 illustrated in FIG. 1.

The traveling control ECU 24, for example, of the control system 3 of the vehicle 2 may execute the selection process illustrated in FIG. 9, in step ST5 of FIG. 6, to control the traveling of the own vehicle.

Step ST11 to step ST14 in FIG. 9 may be similar to those in FIG. 6. After step ST14, the traveling control ECU 24 may cause the flow to proceed to step ST31.

Step ST31 may be a step of determining the traveling phase. The traveling control ECU 24 may determine the current traveling phase in the traveling situation of the own vehicle determined in step ST14.

For example, the traveling control of the vehicle 2 in a traveling situation of parking may be divided into multiple traveling phases, as will be described later. A first phase may be a road-100 forward traveling phase in which the vehicle 2 travels forward on the road 100 in front of a parking position to make a stop. A second phase may be a road-100 backward traveling phase in which the vehicle 2 travels backward from the road 100 toward the parking position. A third phase may be a parking position entry and stop phase in which the vehicle 2 enters the parking position and stops.

The traveling control ECU 24 may thus determine the current traveling phase in the traveling situation. Thereafter, the traveling control ECU 24 may cause the flow to proceed to step ST15. In step ST15, the traveling control ECU 24 may select the vehicle outside captured image to be transmitted to the remote control apparatus 4, depending on the determined traveling situation and traveling phase. The traveling control ECU 24 may select, as the vehicle outside captured image to be transmitted, only some of the vehicle outside captured images of the vehicle outside cameras 63 mounted on the own vehicle.

In a case where a request regarding the vehicle outside captured image to be selected for transmission has been received from the server 5 of the remote control apparatus 4, the traveling control ECU 24 may select some images including the vehicle outside captured image relevant to the request. The server 5 of the remote control apparatus 4 may be able to determine, on its own, for which direction or range the vehicle outside captured image is desired, and transmit a request for the vehicle outside captured image to the vehicle 2, for example, as in the third example embodiment to be described later. In this case, the traveling control ECU 24 may select some images corresponding to the traveling situation and the traveling phase to include the vehicle outside captured image selected and requested by the server 5 of the remote control apparatus 4.

This makes it unnecessary for the traveling control ECU 24 to select, in one traveling situation, all vehicle outside captured images desired in each of multiple traveling phases of the traveling situation. In the example embodiment, it is possible to reduce the vehicle outside captured image to be selected, as compared with the case of selecting the vehicle outside captured image for each traveling situation.

Figure 10:
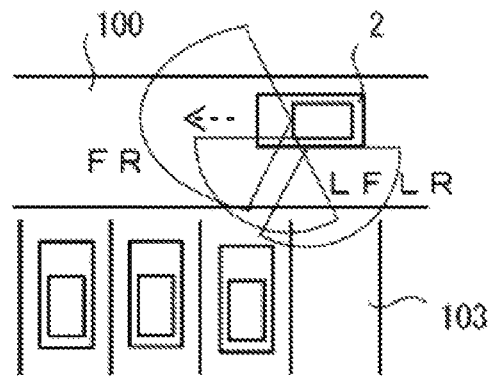
FIG. 10 is an explanatory diagram illustrating an example of correspondence between a traveling situation and a traveling phase of the vehicle illustrated in FIG. 1 and selection of some of the vehicle outside captured images of the vehicle outside cameras.
Figure 10:
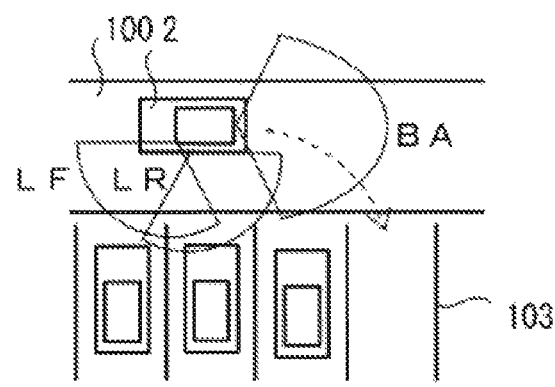
Figure 10:
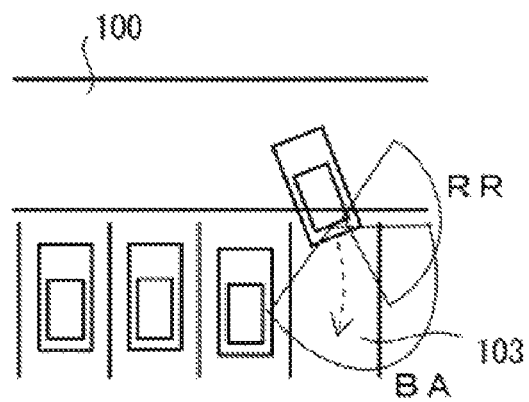

FIG. 10 is an explanatory diagram illustrating an example of correspondence between the traveling situation and the traveling phase of the vehicle 2 illustrated in FIG. 1 and selection of some of the vehicle outside captured images of the vehicle outside cameras 63.

FIG. 10 illustrates, as case 4, a situation in which the vehicle 2 is traveling on the basis of the remote control to perform automatic parking in a parking lot such as valet parking lot.

Step 1, which is the initial traveling phase, at the top of FIG. 10 may be a first traveling phase of the traveling situation of parking. In the first traveling phase, the vehicle 2 traveling on the basis of the remote control may travel on the road 100 in front of a parking position 103, past the parking position 103, and make a stop on the road 100 in front of the parking position 103.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in a situation of traveling on the road 100 of the parking lot. The traveling control ECU 24 may determine in step ST31 that the own vehicle is in the first traveling phase of the traveling situation of parking. In step ST15, the traveling control ECU 24 may select, as the image to be transmitted, only the front-side vehicle outside captured image FR corresponding to the traveling direction of the own vehicle, the left-front-side vehicle outside captured image LF obtained on the side where the parking position 103 is present, and the left-rear-side vehicle outside captured image LR obtained on the side where the parking position 103 is present.

Step 2 in the middle of FIG. 10 may be a second traveling phase of the traveling situation of parking. In the second traveling phase, the vehicle 2 traveling on the basis of the remote control may travel backward, from a state of being stopped on the road 100 in front of the parking position 103, while being steered toward the parking position 103.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in the situation of traveling on the road 100 of the parking lot. The traveling control ECU 24 may determine in step ST31 that the own vehicle is in the second traveling phase of the traveling situation of parking. In step ST15, the traveling control ECU 24 may select, as the image to be transmitted, only the rear-side vehicle outside captured image BA corresponding to a backward traveling direction of the own vehicle, the left-front-side vehicle outside captured image LF obtained on the side where the parking position 103 is present, and the left-rear-side vehicle outside captured image LR obtained on the side where the parking position 103 is present.

Step 3 at the bottom of FIG. 10 may be a third traveling phase of the traveling situation of parking. In the third traveling phase, the vehicle 2 traveling on the basis of the remote control may enter, from the road 100 in front of the parking position 103, toward the parking position 103 and make a stop.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in the situation of traveling on the road 100 of the parking lot. The traveling control ECU 24 may determine in step ST31 that the own vehicle is in the third traveling phase of the traveling situation of parking. In step ST15, the traveling control ECU 24 may select, as the image to be transmitted, only the rear-side vehicle outside captured image BA corresponding to the backward traveling direction of the own vehicle and the right-rear-side vehicle outside captured image RR obtained on the side opposite to a steering direction.

As described above, in the example embodiment, the traveling control ECU 24 may dynamically change the vehicle outside captured image that the vehicle 2 selects for transmission, for each traveling phase in the traveling situation of parking.

In a case where the vehicle 2 is traveling on the basis of the remote control for automatic parking in a parking lot, the traveling control ECU 24 serving as the transmission control unit of the vehicle 2 may dynamically change the vehicle outside captured image to be selected, depending on each of traveling phases through which the vehicle 2 enters from a passage in front of a parking position into the parking position and makes a stop. For example, while the vehicle 2 is traveling to stop on the passage in front of the parking position, the traveling control ECU 24 may select at least the front-side vehicle outside captured image FR of the vehicle 2 and the vehicle outside captured image corresponding to the side of the parking position. While the vehicle 2 is traveling to enter from the stop position to the parking position, the traveling control ECU 24 may select at least the rear-side vehicle outside captured image BA of the vehicle 2 and the vehicle outside captured image corresponding to the side of the parking position. In this case, the vehicle outside cameras 63 mounted on the vehicle 2 may be configured to image the surroundings of the vehicle 2 divided into at least the front side, the right side, the rear side, and the left side of the vehicle 2 to generate, as the vehicle outside captured images, the front-side vehicle outside captured image FR, the right-side vehicle outside captured image, the rear-side vehicle outside captured image BA, and the left-side vehicle outside captured image.

It is possible to reduce the amount of information of the own vehicle information in the example embodiment, as compared with a case of collectively selecting, on the basis of only the determination of the parking situation, all vehicle outside captured images selected in the first traveling phase to the third traveling phase described above. This allows transmission of the upstream data for transmission of the own vehicle information to end in short time. Accordingly, the remote control apparatus 4 is able to generate a remote control value and transmit the remote control value to the vehicle 2 at early timing. In the example embodiment, the time difference of the reception interval of the remote control value with respect to the traveling control cycle in the vehicle 2 is expected to widen. Consequently, even in a case where the communication load between the vehicle 2 and the remote control apparatus 4 is high, the vehicle 2 is able to keep receiving the remote control value without lagging behind the traveling control cycle, and stably continue the remote traveling control. Even in a case where the processing load on the remote control apparatus 4 is high, the vehicle 2 is able to keep receiving the remote control value without lagging behind the traveling control cycle, and stably continue the remote traveling control.

Figure 11:
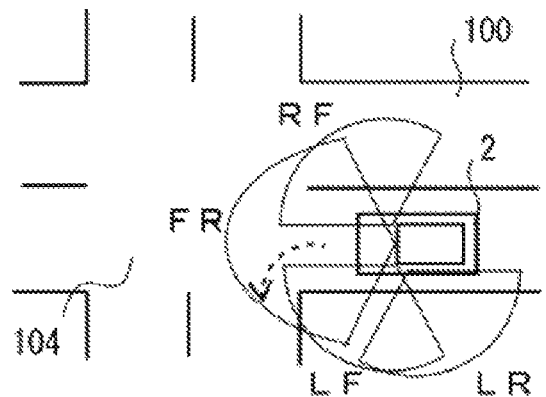
FIG. 11 is an explanatory diagram illustrating another example of correspondence between a traveling situation and a traveling phase of the vehicle illustrated in FIG. 1 and selection of some of the vehicle outside captured images of the vehicle outside cameras.
Figure 11:
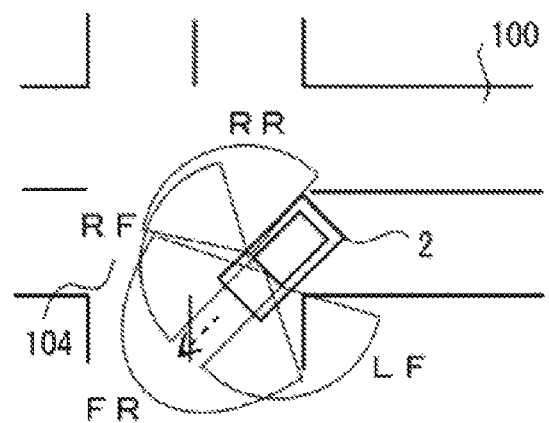
Figure 11:
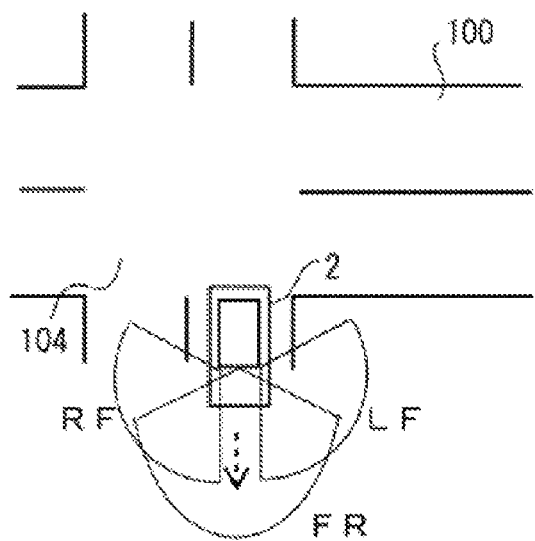

FIG. 11 is an explanatory diagram illustrating another example of correspondence between the traveling situation and the traveling phase of the vehicle 2 illustrated in FIG. 1 and selection of some of the vehicle outside captured images of the vehicle outside cameras 63.

FIG. 11 illustrates, as case 5, a situation in which the vehicle 2 makes a left turn at an intersection 104 on the basis of the remote control.

Step 1, which is the initial traveling phase, at the top of FIG. 11 may be a first traveling phase of the traveling situation of making a left turn. In the first traveling phase, the vehicle 2 traveling on the basis of the remote control may be traveling toward the intersection 104, on the road 100 extending toward the intersection 104.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in a traveling situation of making a left turn at the intersection 104. The traveling control ECU 24 may determine in step ST31 that the own vehicle is in the first traveling phase of the traveling situation of making a left turn. In step ST15, the traveling control ECU 24 may select, as the image to be transmitted, only the front-side vehicle outside captured image FR corresponding to the traveling direction of the own vehicle, the left-front-side vehicle outside captured image LF obtained on the turning side, the left-rear-side vehicle outside captured image LR obtained on the turning side, and the right-front-side vehicle outside captured image RF obtained on the opposite side.

Step 2 in the middle of FIG. 11 may be a second traveling phase of the traveling situation of making a left turn. In the second traveling phase, the vehicle 2 traveling on the basis of the remote control may be traveling to make a left turn within the intersection 104.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in the traveling situation of making a left turn at the intersection 104. The traveling control ECU 24 may determine in step ST31 that the own vehicle is in the second traveling phase of the traveling situation of making a left turn. In step ST15, the traveling control ECU 24 may select, as the image to be transmitted, only the front-side vehicle outside captured image FR corresponding to the traveling direction of the own vehicle, the left-front-side vehicle outside captured image LF obtained on the turning side, the right-front-side vehicle outside captured image RF obtained on the opposite side, and the right-rear-side vehicle outside captured image RR obtained on an outer side of turning.

Step 3 at the bottom of FIG. 11 may be a third traveling phase of the traveling situation of making a left turn. In the third traveling phase, the vehicle 2 traveling on the basis of the remote control may be traveling to leave the intersection 104 after ending the left turn at the intersection 104.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in the traveling situation of making a left turn at the intersection 104. The traveling control ECU 24 may determine in step ST31 that the own vehicle is in the third traveling phase of the traveling situation of making a left turn. In step ST15, the traveling control ECU 24 may select, as the image to be transmitted, only the front-side vehicle outside captured image FR corresponding to the traveling direction of the own vehicle, the left-front-side vehicle outside captured image LF obtained on the turning side, and the right-front-side vehicle outside captured image RF obtained on the opposite side.

As described above, in the example embodiment, the traveling control ECU 24 may dynamically change the vehicle outside captured image that the vehicle 2 selects for transmission, for each traveling phase in the traveling situation of making a left turn at the intersection 104.

In a case where the vehicle 2 makes a left turn at an intersection, the traveling control ECU 24 serving as the transmission control unit of the vehicle 2 may dynamically change the vehicle outside captured image to be selected, depending on each of traveling phases through which the vehicle 2 travels from a road before an entry to the intersection to a road to be traveled after turning. For example, while the vehicle 2 is traveling on the road before the entry, the traveling control ECU 24 may select at least the front-side vehicle outside captured image FR of the vehicle 2. While the vehicle 2 is traveling after beginning to turn at the intersection, the traveling control ECU 24 may select at least the front-side vehicle outside captured image FR, the right-front-side vehicle outside captured image RF, and the left-front-side vehicle outside captured image LF of the vehicle 2, and the vehicle outside captured image corresponding to the outer side of the turning, out of the right-rear-side vehicle outside captured image RR and the left-rear-side vehicle outside captured image LR. In this case, the vehicle outside cameras 63 mounted on the vehicle 2 may be configured to image the surroundings of the vehicle 2 divided into at least the front side, the right-front side, the right-rear side, the rear side, the left-front side, and the left-rear side of the vehicle 2 to generate, as the vehicle outside captured images, the front-side vehicle outside captured image FR, the right-front-side vehicle outside captured image RF, the right-rear-side vehicle outside captured image RR, the rear-side vehicle outside captured image BA, the left-front-side vehicle outside captured image LF, and the left-rear-side vehicle outside captured image LR.

The amount of information of the own vehicle information in the example embodiment is reduced, as compared with a case of collectively selecting, on the basis of only the determination of the situation of making a left turn, all vehicle outside captured images selected in the first traveling phase to the third traveling phase described above. This allows transmission of the upstream data for transmission of the own vehicle information to end in short time. Accordingly, the remote control apparatus 4 is able to generate a remote control value and transmit the remote control value to the vehicle 2 at early timing. In the example embodiment, the time difference of the reception interval of the remote control value with respect to the traveling control cycle in the vehicle 2 is expected to widen. Consequently, even in a case where the communication load between the vehicle 2 and the remote control apparatus 4 is high, the vehicle 2 is able to keep receiving the remote control value without lagging behind the traveling control cycle, and stably continue the remote traveling control. Even in a case where the processing load on the remote control apparatus 4 is high, the vehicle 2 is able to keep receiving the remote control value without lagging behind the traveling control cycle, and stably continue the remote traveling control.

Note that, for selection of the vehicle outside captured image in a case of making a right turn at the intersection 104, the left and right in FIG. 11 may be reversed.

Figure 12:
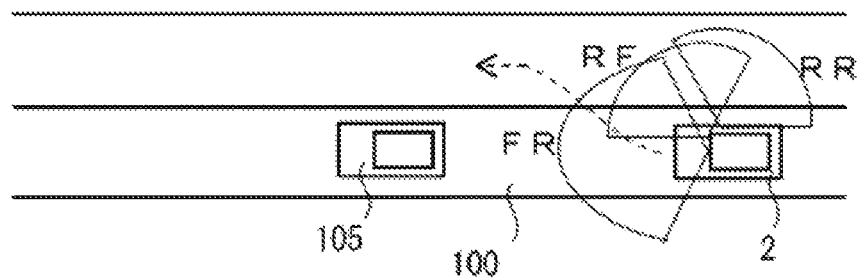
FIG. 12 is an explanatory diagram illustrating another example of correspondence between a traveling situation and a traveling phase of the vehicle illustrated in FIG. 1 and selection of some of the vehicle outside captured images of the vehicle outside cameras.
Figure 12:
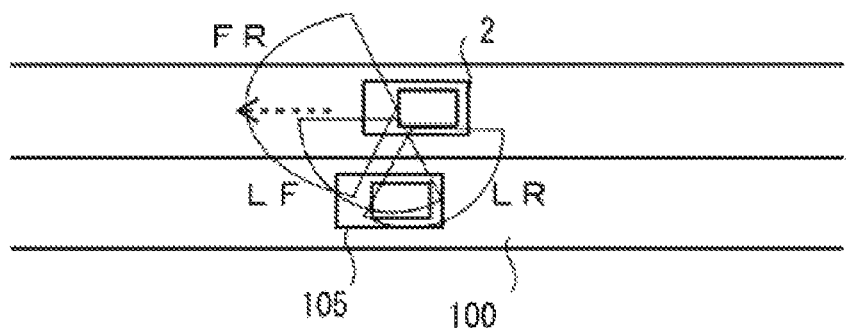
Figure 12:
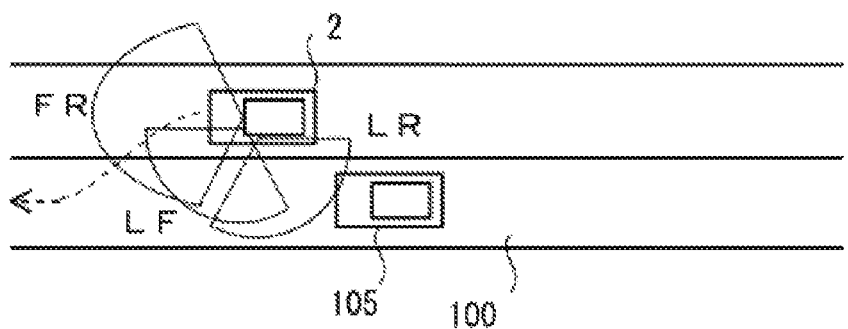

FIG. 12 is an explanatory diagram illustrating another example of correspondence between the traveling situation and the traveling phase of the vehicle 2 illustrated in FIG. 1 and selection of some of the vehicle outside captured images of the vehicle outside cameras 63.

FIG. 12 illustrates, as case 6, a situation in which the vehicle 2 passes a preceding vehicle 105 on the basis of the remote control.

Step 1, which is the initial traveling phase, at the top of FIG. 12 may be a first traveling phase of the traveling situation of passing the preceding vehicle 105. In the first traveling phase, the vehicle 2 traveling on the basis of the remote control may be traveling to make a lane change to move from a lane on which the vehicle 2 is traveling to a passing lane.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in a traveling situation of passing the preceding vehicle 105. The traveling control ECU 24 may determine in step ST31 that the own vehicle is in the first traveling phase of the traveling situation of passing the preceding vehicle 105. In step ST15, the traveling control ECU 24 may select, as the image to be transmitted, only the front-side vehicle outside captured image FR corresponding to the traveling direction of the own vehicle, the right-front-side vehicle outside captured image RF obtained on the side of the lane to which the lane change is to be made, and the right-rear-side vehicle outside captured image RR obtained on the side of the lane to which the lane change is to be made.

Step 2 in the middle of FIG. 12 may be a second traveling phase of the traveling situation of passing the preceding vehicle 105. In the second traveling phase, the vehicle 2 traveling on the basis of the remote control may be traveling on the adjacent passing lane to pass the preceding vehicle 105.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in the traveling situation of passing the preceding vehicle 105. The traveling control ECU 24 may determine in step ST31 that the own vehicle is in the second traveling phase of the traveling situation of passing the preceding vehicle 105. In step ST15, the traveling control ECU 24 may select, as the image to be transmitted, only the front-side vehicle outside captured image FR corresponding to the traveling direction of the own vehicle, the left-front-side vehicle outside captured image LF obtained on the side of the original lane before the lane change, and the left-rear-side vehicle outside captured image LR obtained on the side of the original lane before the lane change. One or both of the left-front-side vehicle outside captured image LF and the left-rear-side vehicle outside captured image LR may include an image of the preceding vehicle 105 to be passed by the vehicle 2.

Step 3 at the bottom of FIG. 12 may be a third traveling phase of the traveling situation of passing the preceding vehicle 105. In the third traveling phase, the vehicle 2 traveling on the basis of the remote control may be traveling to make a lane change to move from the adjacent passing lane to the original lane.

In this traveling situation, the traveling control ECU 24 may determine in step ST3 that the communication situation or the remote processing situation can influence the traveling control. The traveling control ECU 24 may select, in step ST5, only some of the vehicle outside captured images of the vehicle outside cameras 63 mounted on the own vehicle. In one example, the traveling control ECU 24 may determine in step ST14 that the own vehicle is in the traveling situation of passing the preceding vehicle 105. The traveling control ECU 24 may determine in step ST31 that the own vehicle is in the third traveling phase of the traveling situation of passing the preceding vehicle 105. In step ST15, the traveling control ECU 24 may select, as the image to be transmitted, only the front-side vehicle outside captured image FR corresponding to the traveling direction of the own vehicle, the left-front-side vehicle outside captured image LF obtained on the side of the original lane before the lane change, and the left-rear-side vehicle outside captured image LR obtained on the side of the original lane before the lane change. The left-rear-side vehicle outside captured image LR may include an image of the preceding vehicle 105 that has been passed by the vehicle 2.

As described above, in the example embodiment, the traveling control ECU 24 may dynamically change the vehicle outside captured image that the vehicle 2 selects for transmission, for each traveling phase in the traveling situation of passing the preceding vehicle 105.

In a case where the vehicle 2 is controlled to travel by the remote control to pass a preceding vehicle, the traveling control ECU 24 serving as the transmission control unit of the vehicle 2 may dynamically change the vehicle outside captured image to be selected, depending on each of traveling phases through which the vehicle 2 moves from a lane on which the vehicle 2 is traveling to a passing lane and returns. For example, while the vehicle 2 is traveling to move from the lane on which the vehicle 2 is traveling to the passing lane, the traveling control ECU 24 may select at least the front-side vehicle outside captured image FR of the vehicle 2 and the vehicle outside captured image corresponding to the side of the passing lane out of the right-rear side and the left-rear side. While the vehicle 2 is traveling to move from the passing lane to the original lane on which the vehicle 2 has been traveling, the traveling control ECU 24 may select at least the front-side vehicle outside captured image FR of the vehicle 2 and the vehicle outside captured image corresponding to the side of the original lane out of the right-rear side and the left-rear side. In this case, the vehicle outside cameras 63 mounted on the vehicle 2 may be configured to image the surroundings of the vehicle 2 divided into at least the front side, the right-front side, the right-rear side, the rear side, the left-front side, and the left-rear side of the vehicle 2.

The amount of information of the own vehicle information in the example embodiment is reduced, as compared with a case of collectively selecting, on the basis of only the determination of the situation of passing the preceding vehicle, all vehicle outside captured images selected in the first traveling phase to the third traveling phase described above. This allows transmission of the upstream data for transmission of the own vehicle information to end in short time. Accordingly, the remote control apparatus 4 is able to generate a remote control value and transmit the remote control value to the vehicle 2 at early timing. In the example embodiment, the time difference of the reception interval of the remote control value with respect to the traveling control cycle in the vehicle 2 is expected to widen. Consequently, even in a case where the communication load between the vehicle 2 and the remote control apparatus 4 is high, the vehicle 2 is able to keep receiving the remote control value without lagging behind the traveling control cycle, and stably continue the remote traveling control. Even in a case where the processing load on the remote control apparatus 4 is high, the vehicle 2 is able to keep receiving the remote control value without lagging behind the traveling control cycle, and stably continue the remote traveling control.

Third Example Embodiment

Described next is the remote control system 1 for the traveling of the vehicle 2 according to a third example embodiment of the disclosure.

In an example embodiment described above, only each vehicle 2 that is controlled remotely may determine the traveling situation or each traveling phase of the own vehicle, and select some vehicle outside captured images depending on a result of the determination. Communication of the remote control value is not delayed by only the processing load on the remote control apparatus 4, and can be delayed also by the communication load between the vehicles 2 and the remote control apparatus 4. In this case, there is a possibility that the processing load on the remote control apparatus 4 itself is not so high as to cause delay in the communication of the remote control value. Under such a situation, the remote control apparatus 4 may be able to execute a process other than the process of generating the remote control values for the vehicles 2 under control.

Mainly described below are differences from the example embodiments described above.

Figure 13:
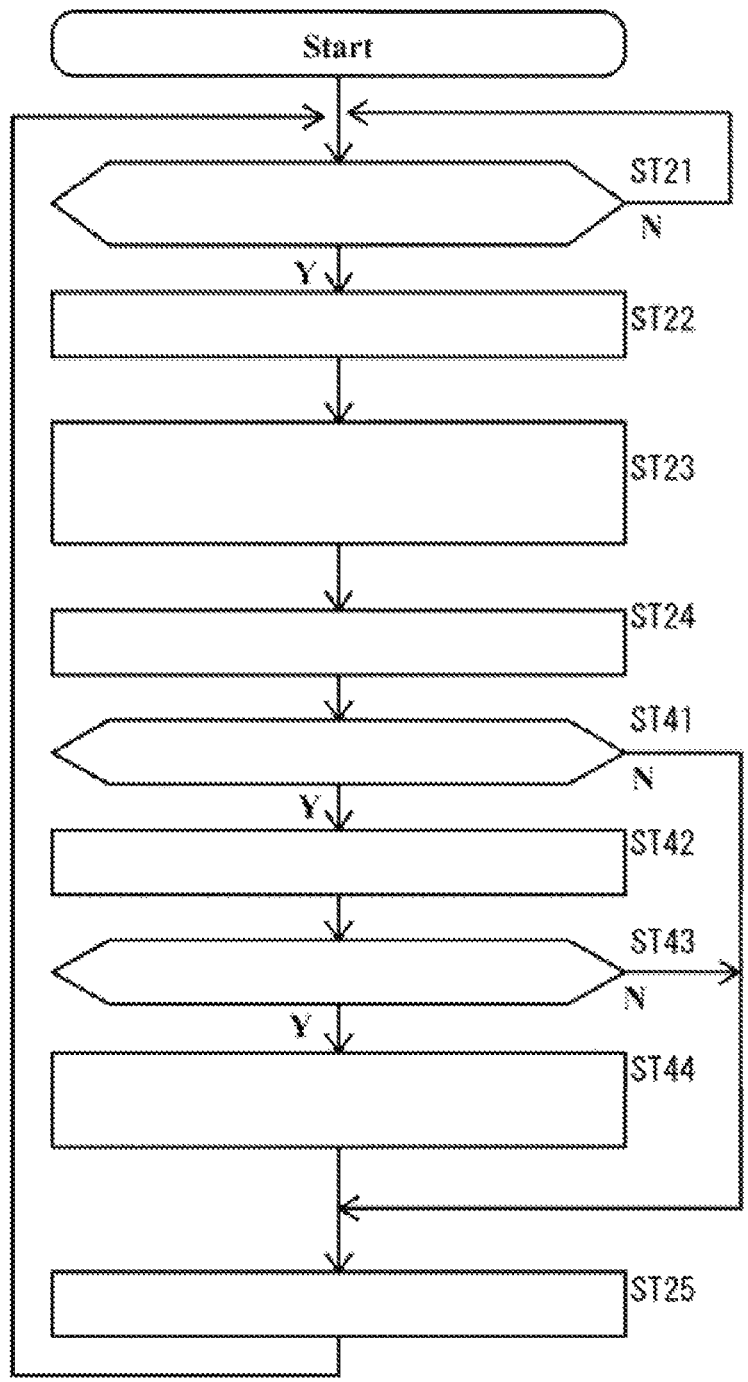
FIG. 13 is a flowchart illustrating remote control according to one example embodiment to be performed by the server of the remote control apparatus illustrated in FIG. 1.

FIG. 13 is a flowchart illustrating remote control according to the third example embodiment to be performed by the server 5 of the remote control apparatus 4 illustrated in FIG. 1.

The server CPU 15 of the server 5 of the remote control apparatus 4 may repeat the remote control illustrated in FIG. 13.

Step ST21 to step ST24 may be similar to those in FIG. 7. After step ST24, the server CPU 15 may cause the flow to proceed to step ST41.

Step ST41 may be a step of determining whether an additional process is executable. The server CPU 15 may determine whether the server 5 of the remote control apparatus 4 is able to execute an additional process. For example, in a case where the number of the vehicles 2 under management is small, the processing load on the server 5 of the remote control apparatus 4 is light. The server CPU 15 may count, for example, the number of the vehicles 2 currently under management, and determine that an additional process is executable in a case where the count value is smaller than a threshold. In another example, the server CPU 15 may determine that an additional process is executable in a case where the most recent number of processing steps per unit time is smaller than a threshold. The server CPU 15 may determine that an additional process is executable, for example, every predetermined time interval.

If an additional process is executable (ST41: Y), the server CPU 15 may cause the flow to proceed to step ST42. If an additional process is not executable (ST41: N), the server CPU 15 may cause the flow to proceed to step ST25.

Step ST42 may be a step of determining another vehicle present in a missing direction. The server CPU 15 may determine a situation in the direction missing in the own vehicle information of the vehicle 2 under processing.

The vehicle 2 may transmit not all of but some of the vehicle outside captured images captured by the vehicle outside cameras 63 to the server 5 of the remote control apparatus 4. In this case, the server CPU 15 may not determine the traveling situation for the direction not included in the vehicle outside captured image of the own vehicle information regarding the vehicle 2 under processing. For example, when the vehicle 2 is making a left turn at the intersection 104 in the middle of FIG. 11, in a case where another vehicle approaches from behind the own vehicle, the server CPU 15 may not determine a traveling situation involving the other vehicle approaching from behind the own vehicle. The server CPU 15 may determine the situation in the direction missing in the own vehicle information of the vehicle 2 under processing, on the basis of information other than the own vehicle information of the vehicle 2 under processing, such as the own vehicle information of the other vehicle, traffic information, or traffic control information.

Step ST43 may be a step of determining influence on the traveling. The server CPU 15 may determine whether another mobile body in the missing direction determined in step ST42 influences the traveling of the vehicle 2 under processing.

For example, when the vehicle 2 is making a left turn at the intersection 104 in the middle of FIG. 11, the other vehicle approaching from behind the own vehicle has a relatively high speed and the vehicle 2 can be unable to leave the intersection 104 before the other vehicle reaches the intersection 104. In this case (ST43: Y), the server CPU 15 may determine that the traveling of the vehicle 2 under processing can be influenced, and cause the flow to proceed to step ST44.

In contrast, the other vehicle approaching from behind the own vehicle has a low speed and the vehicle 2 may be able to leave the intersection 104 before the other vehicle reaches the intersection 104. In this case (ST43: N), the server CPU 15 may determine that the traveling of the vehicle 2 under processing will not be influenced, and cause the flow to proceed to step ST25.

Step ST44 may be a step of generating a transmission request for the image of the direction in which the approaching other vehicle is present. The server CPU 15 may generate a transmission request for the vehicle outside captured image that is able to represent the situation in the direction of the approaching other vehicle. For example, the server CPU 15 may generate a transmission request for the rear-side vehicle outside captured image BA. Thereafter, the server CPU 15 may cause the flow to proceed to step ST25.

In this case, the server CPU 15 may transmit, in step ST25, the image transmission request generated in step ST44 to the relevant vehicle 2 that has transmitted the own vehicle information, together with the acquired remote control value. The control system 3 of the vehicle 2 that has transmitted the own vehicle information may be in a reception wait state for the remote control value in step ST7, after having transmitted the own vehicle information in step ST6 of FIG. 6. The control system 3 of the vehicle 2 that has transmitted the own vehicle information may execute the remote traveling control by using the remote control value received from the server 5 in step ST9.

Thereafter, the server CPU 15 may cause the flow to return to step ST21. The server CPU 15 of the server 5 of the remote control apparatus 4 may thus repeat the remote control illustrated in FIG. 13. This enables the server CPU 15 to keep generating and transmitting the remote control value based on the latest own vehicle information of each vehicle 2 repeatedly, for each of the vehicles 2. In addition, in a case where there is a margin in processing, the server CPU 15 may execute step ST41 to step ST44. The server CPU 15 may execute a determination process regarding the direction missing in the own vehicle information of each vehicle 2, and generate and transmit a transmission request for the vehicle outside captured image for higher safety.

Figure 14:
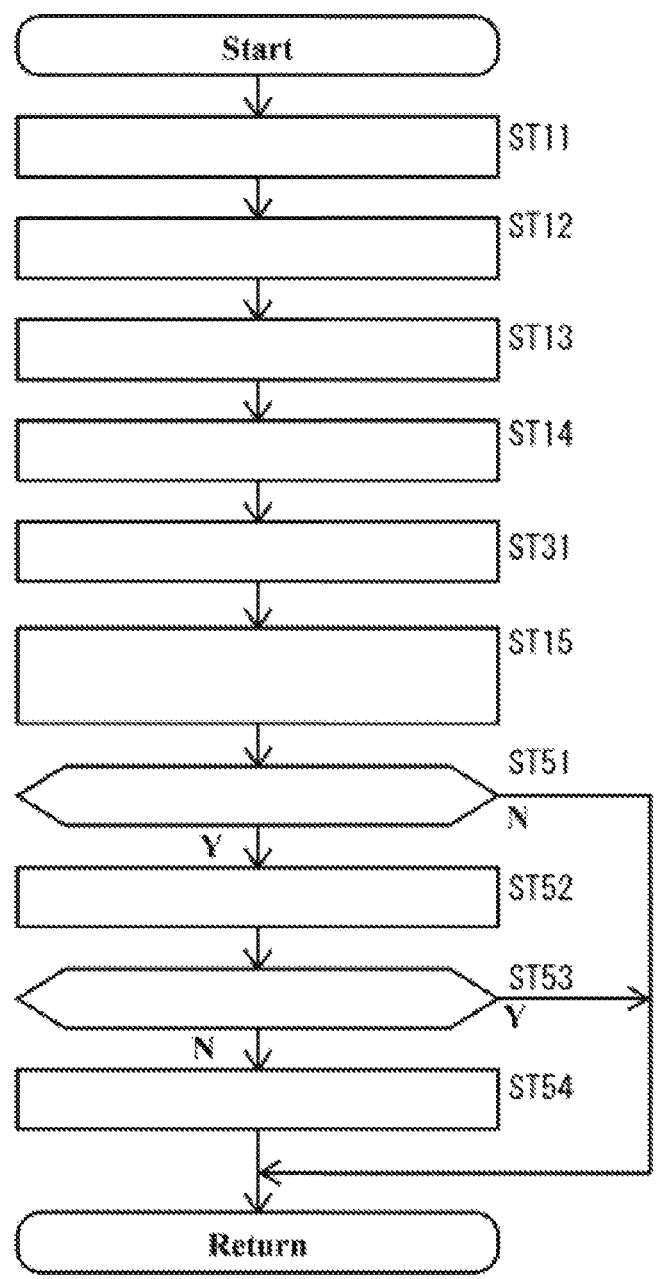
FIG. 14 is a flowchart illustrating a vehicle outside captured image selection process according to one example embodiment to be performed by the control system of the vehicle illustrated in FIG. 1.

FIG. 14 is a flowchart illustrating a vehicle outside captured image selection process according to the third example embodiment, to be performed by the control system 3 of the vehicle 2 illustrated in FIG. 1.

The traveling control ECU 24, for example, of the control system 3 of the vehicle 2 may execute the selection process illustrated in FIG. 14, in step ST5 of FIG. 6, to control the traveling of the own vehicle.

Step ST11 to step ST14, step ST31, and step ST15 in FIG. 14 may be similar to those in FIG. 9. After step ST15, the traveling control ECU 24 may cause the flow to proceed to step ST51.

Step ST51 may be a step of determining presence or absence of an image transmission request. The traveling control ECU 24 may determine whether a transmission request for a vehicle outside captured image has been received from the remote control apparatus 4. If an image transmission request has been received (ST51: Y), the traveling control ECU 24 may cause the flow to proceed to step ST52. If an image transmission request has not been received (ST51: N), the traveling control ECU 24 may end the process illustrated in FIG. 14, and cause the flow to proceed to step ST6 of FIG. 6. In this case, the traveling control ECU 24 may transmit some vehicle outside captured images selected in step ST15 to the remote control apparatus 4.

Step ST52 may be a step of adding the image relevant to the request. The traveling control ECU 24 may add the vehicle outside captured image relevant to the request to some vehicle outside captured images selected in step ST15.

Step ST53 may be a step of determining whether the images selected after the addition remain to be some of all images. The traveling control ECU 24 may determine whether the vehicle outside captured images selected after the addition remain to be some of the vehicle outside captured images of the vehicle outside cameras 63 of the own vehicle. If the vehicle outside captured images selected after the addition are not some of but all of the vehicle outside captured images of the vehicle outside cameras 63 of the own vehicle (ST53: N), the traveling control ECU 24 may cause the flow to proceed to step ST54. In contrast, if the selected vehicle outside captured images remain to be some of the vehicle outside captured images of the vehicle outside cameras 63 of the own vehicle even after the addition (ST53: Y), the traveling control ECU 24 may end the process illustrated in FIG. 14, and cause the flow to proceed to step ST6 of FIG. 6. In this case, the traveling control ECU 24 may transmit the vehicle outside captured image requested by the remote control apparatus 4 to the remote control apparatus 4, together with some vehicle outside captured images selected in step ST15.

Step ST54 may be a step of re-selecting an image. The traveling control ECU 24 may re-select some images for transmission, from the vehicle outside captured images of the vehicle outside cameras 63 of the own vehicle.

In this case, the traveling control ECU 24 may re-select the image to be transmitted, for example, to include the vehicle outside captured image relevant to the request and select some of the vehicle outside captured images of the vehicle outside cameras 63 of the own vehicle. Thereafter, the traveling control ECU 24 may end the process illustrated in FIG. 14, and cause the flow to proceed to step ST6 of FIG. 6. In this case, the traveling control ECU 24 may transmit, to the remote control apparatus 4 in step ST54, some vehicle outside captured images re-selected to include the vehicle outside captured image requested by the remote control apparatus 4.

Note that the vehicle outside captured image selected by the traveling control ECU 24 after the addition may be not some of but all of the vehicle outside captured images of the vehicle outside cameras 63 of the own vehicle in step ST53. In this case, the traveling control ECU 24 may end the process illustrated in FIG. 14, exceptionally keeping the selection of all of the vehicle outside captured images of the vehicle outside cameras 63 of the own vehicle. In this case, the traveling control ECU 24 may cause the flow to proceed to step ST6 of FIG. 6, and exceptionally transmit all of the vehicle outside captured images of the vehicle outside cameras 63 of the own vehicle to the remote control apparatus 4.

As described above, in the example embodiment, the server CPU 15 of the server 5 of the remote control apparatus 4 may serve as an event determining unit. The server CPU 15 may determine presence or absence of an event such as another vehicle that can influence the traveling of the vehicle 2, in the direction of the vehicle outside captured image missing in the own vehicle information received from the vehicle 2. The server CPU 15 of the server 5 may transmit, to the vehicle 2 together with the remote control value generated by the remote control value generator 6, a transmission request for the vehicle outside captured image of the direction in which the event is determined as being present.

The traveling control ECU 24 of the control system 3 of the vehicle 2, serving as the transmission control unit, may receive a transmission request from the remote control apparatus 4 in some cases. In this case, the traveling control ECU 24 may select some of the vehicle outside captured images of the vehicle outside cameras 63 mounted on the own vehicle, including the vehicle outside captured image requested by the remote control value generator 6, and transmit the selected vehicle outside captured images to the remote control value generator 6.

Thereafter, the server CPU 15 of the server 5 is able to, in step ST21 to ST24 of FIG. 13, process the vehicle outside captured image regarding the direction in which the event that exerts influence, such as the other vehicle, is determined as being present, and generate the remote control value. The server CPU 15 may generate the remote control value to be generated for the remote control of the vehicle 2, to correspond to the traveling situation of the vehicle 2 more favorably.

The server CPU 15 of the server 5 of the remote control apparatus 4, serving as the event determining unit, may determine presence or absence of an event that can influence the traveling of the vehicle 2, in the direction of the vehicle outside captured image missing in the own vehicle information received from the vehicle 2. The server CPU 15 may transmit, to the vehicle 2 together with the remote control value generated by the remote control value generator 6, a transmission request for the vehicle outside captured image of the direction in which the event is determined as being present. In a case where a transmission request has been received from the remote control apparatus 4, the traveling control ECU 24 serving as the transmission control unit may select some of the vehicle outside captured images of the vehicle outside cameras 63 mounted on the own vehicle, including the vehicle outside captured image requested by the remote control apparatus 4.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In an example embodiment described above, the remote control apparatus 4 may include one server 5 and one remote control value generator 6.

In another example, the server 5 or the remote control value generator 6 of the remote control apparatus 4 may include multiple devices by, for example, being divided in predetermined units. The predetermined unit may be, for example, a region or the number of the vehicles 2. The server 5 or the remote control value generator 6 may be divided into multiple devices by function or processing load. The multiple servers 5 or the multiple remote control value generators 6 may be distributed by, for example, being incorporated in the base stations 9 of the fifth-generation communication network 8.

In an example embodiment described above, the vehicle outside cameras 63 mounted on the vehicle 2 may image the 360-degree range around the vehicle 2, divided into the front side, the right-front side, the right-rear side, the rear side, the left-front side, and the left-rear side of the vehicle 2, as illustrated in FIG. 5.

The vehicle outside cameras 63 mounted on the vehicle 2 may image the 360-degree range around the vehicle 2, divided into any multiple ranges. For example, the vehicle outside cameras 63 mounted on the vehicle 2 may image the 360-degree range around the vehicle 2, divided into the front side, the right side, the rear side, and the left side of the vehicle 2.

Each of the server CPU 15 and the traveling control ECU 24 illustrated in FIGS. 2 and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the server CPU 15 and the traveling control ECU 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the server CPU 15 and the traveling control ECU 24 illustrated in FIGS. 2 and 3.

The invention claimed is:

1. A vehicle comprising circuitry configured perform in each control cycle repeated at constant time intervals:
   transmitting vehicle information to a server;
   after transmission of the vehicle information, receiving a remote control value corresponding to the transmitted vehicle information from the server at a first timing; and
   in response to receiving the remote control value, execute control of the vehicle by using the received remote control value at a second timing,
   wherein the circuitry is further configured to:
      prior to the transmission of the vehicle information, determine whether a time difference, in a previous control cycle prior to a current control cycle, from the first timing to the second timing is smaller than a predetermined threshold;
      in response to determining that the time difference is equal to or greater than the predetermined threshold, include a first image and a second image in the vehicle information, the first and second images being captured by first and second cameras provided on the vehicle; and
      in response to determining that the time difference is smaller than the predetermined threshold, include the first image and not include the second image in the vehicle information.

2. A vehicle traveling remote control system in which a remote control apparatus is configured to communicate with vehicles, and configured to periodically transmit, to a respective vehicle, a remote control value to be used to control traveling of the respective vehicle, the vehicle traveling remote control system comprising:
   remote traveling control units, each of which is provided in the respective vehicle, and configured to (1) receive a remote control value from the remote control apparatus at a first timing and (2) execute traveling control by using the most recently received remote control value at a second timing after the first timing, the second timing being generated repeatedly at constant predetermined intervals;
   transmission control units, each of which is provided in the respective vehicle, wherein the respective vehicle has multiple cameras configured to capture first images of areas surrounding the respective vehicle, and wherein each transmission control unit is configured to:
      obtain the first images of the areas surrounding the respective vehicle;
      determine whether a time difference from the first timing to the second timing is smaller than a predetermined threshold;
      in response to determining that the time difference is equal to or greater than the predetermined threshold,
         (1) include all of the first images to vehicle information, and
         (2) transmit the vehicle information to the remote control apparatus so that the remote control apparatus generates the remote control value to be used in the traveling control of the respective vehicle; and
      in response to determining that the time difference is smaller than the predetermined threshold,
         (1) identify a driving scenario that represents a movement of the respective vehicle and an environment surrounding the respective vehicle,
         (2) select one or more second images, based on the identified driving scenario, from the first images, the one or more second images being part of the first images but not all of the first images,
         (3) include the one or more second images to the vehicle information and not include one or more third images to the vehicle information, the one or more third images being part of the first images but not the one or more second images, and
         (4) transmit the vehicle information to the remote control apparatus so that the remote control apparatus generates the remote control value to be used in the traveling control of the respective vehicle.

3. The vehicle traveling remote control system according to claim 1, wherein
   the remote control apparatus is configured to transmit, as the remote control value, at least a steering amount and an acceleration or deceleration control amount for the respective vehicle and a control value to be used to control a lighting state of an exterior lamp of the respective vehicle, and
   the transmission control unit of the respective vehicle is configured to:
      estimate, on a basis of the remote control value received from the remote control apparatus, a future course of the traveling of the respective vehicle based on previously received remote control values; and
      select the one or more second images from the first images based on the estimated course.

4. The vehicle traveling remote control system according to claim 3, wherein the areas surrounding the respective vehicle to be captured by the cameras of the respective vehicle include a front side, a right side, a rear side, and a left side of the respective vehicle, wherein the cameras are configured to generate a front-side image, a right-side image, a rear-side vehicle outside captured image, and a left-side image, the first images include the front-side image, the right-side image, the rear-side image, and the left-side image, and the transmission control unit of the respective vehicle is configured to, in a case where the respective vehicle is controlled to travel by remote control to perform automatic parking in a parking lot, dynamically change the one or more second images to be selected from the first images of the areas surrounding the respective vehicle based on each of traveling phases of the identified traveling scenario through which the respective vehicle enters from a passage in front of a parking position into the parking position and makes a stop, the transmission control unit of the respective vehicle being configured to:

select, as the one or more second images, the front-side image and an image corresponding to a side of the parking position, from the first images, while the respective vehicle is traveling to stop at a stop position on the passage in front of the parking position; and select, as the one or more second images, the rear-side image and the image corresponding to the side of the parking position, from the first images, while the respective vehicle is traveling to enter from the stop position into the parking position.

5. The vehicle traveling remote control system according to claim 4, wherein the areas surrounding the respective vehicle to be captured by the cameras of the respective vehicle include a front side, a right-front side, a right-rear side, a rear side, a left-front side, and a left-rear side of the respective vehicle, wherein the cameras are configured to generate a front-side vehicle outside image, a right-front-side image, a right-rear-side image, a rear-side image, a left-front-side image, and a left-rear-side image, the first images include the front-side image, the right-front-side image, the right-rear-side image, the rear-side image, the left-front-side image, and the left-rear-side image, and the transmission control unit of the respective vehicle is configured to, in a case where the respective vehicle is controlled to travel by remote control to make a right turn or a left turn at an intersection, dynamically change the one or more second images to be selected from the first images based on each of traveling phases of the identified traveling scenario through which the respective vehicle travels from a road before an entry to the intersection to a road to be traveled after turning, the transmission control unit of the respective vehicle being configured to:

select, as the one or more second images, at least the front-side first image from the images, while the respective vehicle is traveling on the road before the entry; and select, as the one or more second images, from the first images, the front-side image, the right-front-side image, the left-front-side image, and a captured image corresponding to an outer side of the turning, out of the right-rear-side image and the left-rear-side image, while the respective vehicle is traveling after beginning to turn at the intersection.

6. The vehicle traveling remote control system according to claim 3, wherein the areas surrounding the respective vehicle to be captured by the cameras of the respective vehicle include a front side, a right-front side, a right-rear side, a rear side, a left-front side, and a left-rear side of the respective vehicle, wherein the cameras are configured to generate a front-side image, a right-front-side image, a right-rear-side image, a rear-side image, a left-front-side image, and a left-rear-side image, the first images include the front-side image, the right-front-side image, the right-rear-side image, the rear-side image, the left-front-side image, and the left-rear-side image, and the transmission control unit of the respective vehicle is configured to, in a case where the respective vehicle is controlled to travel by remote control to make a right turn or a left turn at an intersection, dynamically change the one or more second images to be selected from the first images based on each of traveling phases of the identified traveling scenario through which the respective vehicle travels from a road before an entry to the intersection to a road to be traveled after turning, the transmission control unit of the respective vehicle being configured to:

select, as the one or more second images, the front-side image from the first images, while the respective vehicle is traveling on the road before the entry; and select, as the one or more second images, from the first images, the front-side image, the right-front-side image, the left-front-side image, and a captured image corresponding to an outer side of the turning, out of the right-rear-side image and the left-rear-side image, while the respective vehicle is traveling after beginning to turn at the intersection.

7. The vehicle traveling remote control system according to claim 1, wherein the areas surrounding the respective vehicle to be captured by the cameras of the respective vehicle include a front side, a right side, a rear side, and a left side of the respective vehicle, wherein the cameras are configured to generate a front-side image, a right-side image, a rear-side image, and a left-side image, the first images include the front-side image, the right-side image, the rear-side image, and the left-side image, and the transmission control unit of the respective vehicle is configured to, in a case where the respective vehicle is controlled to travel by remote control to perform automatic parking in a parking lot, dynamically change the one or more second images to be selected from the first images of the areas surrounding the respective vehicle based on each of traveling phases of the identified traveling scenario through which the respective vehicle enters from a passage in front of a parking position into the parking position and makes a stop, the transmission control unit of the respective vehicle being configured to:

select, as the one or more second images, the front-side image and an image corresponding to a side of the parking position, from the first images, while the respective vehicle is traveling to stop at a stop position on the passage in front of the parking position; and select, as the one or more second images, the rear-side image and the image corresponding to the side of the parking position, from the first images, while the respective vehicle is traveling to enter from the stop position into the parking position.

8. The vehicle traveling remote control system according to claim 7, wherein
the areas surrounding the respective vehicle to be captured by the cameras of the respective vehicle include a front side, a right-front side, a right-rear side, a rear side, a left-front side, and a left-rear side of the respective vehicle, wherein the cameras are configured to generate a front-side image, a right-front-side image, a right-rear-side image, a rear-side image, a left-front-side image, and a left-rear-side image,
the first images include the front-side image, the right-front-side image, the right-rear-side image, the rear-side image, the left-front-side image, and the left-rear-side image, and
the transmission control unit of the respective vehicle is configured to, in a case where the respective vehicle is controlled to travel by remote control to make a right turn or a left turn at an intersection, dynamically change the one or more second images to be selected from the first images based on each of traveling phases of the identified traveling scenario through which the respective vehicle travels from a road before an entry to the intersection to a road to be traveled after turning, the transmission control unit of the respective vehicle being configured to:
select, as the one or more second images, the front-side image from the first images, while the respective vehicle is traveling on the road before the entry; and
select, as the one or more second images, from the first images, the front-side image, the right-front-side image, the left-front-side image, and a captured image corresponding to an outer side of the turning, out of the right-rear-side image and the left-rear-side image, while the respective vehicle is traveling after beginning to turn at the intersection.

9. The vehicle traveling remote control system according to claim 1, wherein
the areas surrounding the respective vehicle to be captured by the cameras of the respective vehicle include a front side, a right-front side, a right-rear side, a rear side, a left-front side, and a left-rear side of the respective vehicle, wherein the cameras are configured to generate a front-side image, a right-front-side image, a right-rear-side image, a rear-side image, a left-front-side image, and a left-rear-side image,
the first images include the front-side image, the right-front-side image, the right-rear-side image, the rear-side image, the left-front-side image, and the left-rear-side image, and
the transmission control unit of the respective vehicle is configured to, in a case where the respective vehicle is controlled to travel by remote control to make a right turn or a left turn at an intersection, dynamically change the one or more second images to be selected from the first images based on each of traveling phases of the identified traveling scenario through which the respective vehicle travels from a road before an entry to the intersection to a road to be traveled after turning, the transmission control unit of the respective vehicle being configured to:
select, as the one or more second images, the front-side image from the first images, while the respective vehicle is traveling on the road before the entry; and
select, as the one or more second images, from the first images, the front-side image, the right-front-side image, the left-front-side image, and a captured image corresponding to an outer side of the turning, out of the right-rear-side image and the left-rear-side image, while the respective vehicle is traveling after beginning to turn at the intersection.

10. A vehicle traveling remote control system in which a remote control apparatus is configured to communicate with vehicles, and configured to periodically transmit, to a respective vehicle, a remote control value to be used to control traveling of the respective vehicle, the vehicle traveling remote control system comprising: circuitry provided in the respective vehicle each of the vehicles and configured to:
receive a remote control value from the remote control apparatus at a first timing;
execute traveling control by using the most recently received remote control value at a second timing after the first timing, the second timing being generated repeatedly at constant predetermined intervals;
obtain first images of areas surrounding the respective vehicle, wherein the respective vehicle has multiple cameras configured to capture the first images of the areas surrounding the respective vehicle;
determine whether a time difference from the first timing to the second timing is smaller than a predetermined threshold;
in response to determining that the time difference is equal to or greater than the predetermined threshold,
(1) include all of the first images to vehicle information, and
(2) transmit the vehicle information including all the images to the remote control apparatus so that the remote control apparatus generates the remote control value to be used in the traveling control of the respective vehicle; and
in response to determining that the time difference is smaller than the predetermined threshold,
(1) identify a driving scenario that represents a movement of the respective vehicle and an environment surrounding the respective vehicle,
(2) select one or more second images, based on the identified driving scenario, from the first images, the one or more second images being part of the first images but not all of the first images,
(3) include the one or more second images to the vehicle information and not include one or more third images to the vehicle information, the one or more third images being part of the first images but not the one or more second images, and
(4) transmit the vehicle information to the remote control apparatus so that the remote control apparatus generates the remote control value to be used in the traveling control of the respective vehicle.

* * * * *